United States Patent
Yasui et al.

(10) Patent No.: US 7,451,754 B2
(45) Date of Patent: Nov. 18, 2008

(54) CONTROL SYSTEM FOR INTERNAL COMBUSTION ENGINE

(75) Inventors: Yuji Yasui, Saitama-ken (JP);
Mitsunobu Saito, Saitama-ken (JP);
Hiroshi Tagami, Saitama-ken (JP);
Kosuke Higashitani, Saitama-ken (JP);
Masahiro Sato, Saitama-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 11 days.

(21) Appl. No.: 11/587,966

(22) PCT Filed: Apr. 21, 2005

(86) PCT No.: PCT/JP2005/007618

§ 371 (c)(1),
(2), (4) Date: Oct. 27, 2006

(87) PCT Pub. No.: WO2005/106226

PCT Pub. Date: Nov. 10, 2005

(65) Prior Publication Data

US 2007/0225892 A1 Sep. 27, 2007

(30) Foreign Application Priority Data

Apr. 28, 2004 (JP) ............................. 2004-133677

(51) Int. Cl.
*F02D 41/18* (2006.01)

(52) U.S. Cl. .................... 123/681; 123/90.15; 123/682; 123/683; 701/104

(58) Field of Classification Search ................. 123/681, 123/682, 683, 90.15–90.18; 701/104
See application file for complete search history.

(56) References Cited

U.S. PATENT DOCUMENTS

| | | | | | |
|---|---|---|---|---|---|
| 4,275,694 | A | * | 6/1981 | Nagaishi | 123/463 |
| 6,470,869 | B1 | * | 10/2002 | Russell et al. | 123/681 |
| 6,868,327 | B2 | * | 3/2005 | Muto | 701/103 |
| 7,305,977 | B1 | * | 12/2007 | Stroh | 123/679 |

FOREIGN PATENT DOCUMENTS

| | | |
|---|---|---|
| JP | 62-7377 B2 | 2/1987 |
| JP | 63-150449 A | 6/1988 |
| JP | 10-47138 A | 2/1998 |
| JP | 2000-80937 A | 3/2000 |
| JP | 2000-274302 A | 10/2000 |
| JP | 3185438 B2 | 7/2001 |

* cited by examiner

*Primary Examiner*—Erick Solis
(74) *Attorney, Agent, or Firm*—Arent Fox LLP

(57) ABSTRACT

A control system for an internal combustion engine, which is capable of enhancing the accuracy of fuel control and ignition timing control even when there is a possibility that the reliability of a calculated intake air amount lowers, and enables reduction of manufacturing costs. An ECU of the control system calculates a first estimated intake air amount according to a valve lift, a cam phase, and a compression ratio, calculates a second estimated intake air amount according to the flow rate of air detected by an air flow sensor. The ECU determines a fuel injection amount according to the first estimated intake air amount when an estimated flow rate Gin_vt calculated based on an engine speed, the valve lift, the cam phase, and the compression ratio is within the range of $Gin\_vt \leqq Gin1$, and according to the second estimated intake air amount when $Gin2 \leqq Gin\_vt$.

7 Claims, 25 Drawing Sheets

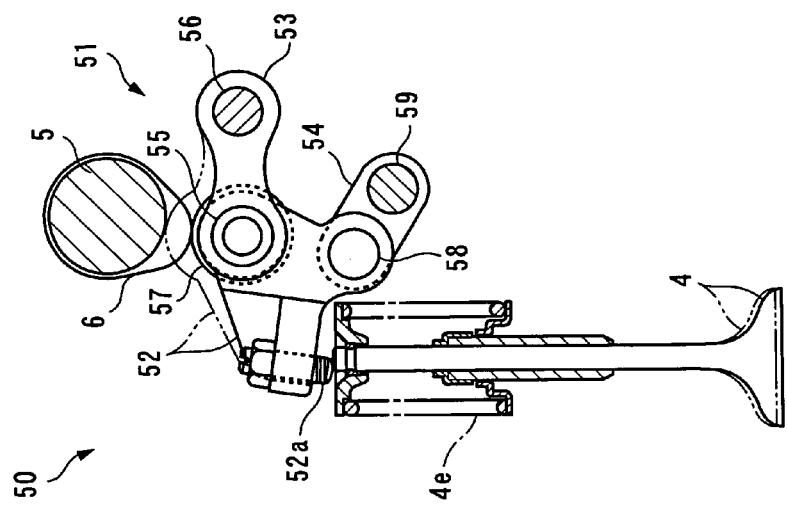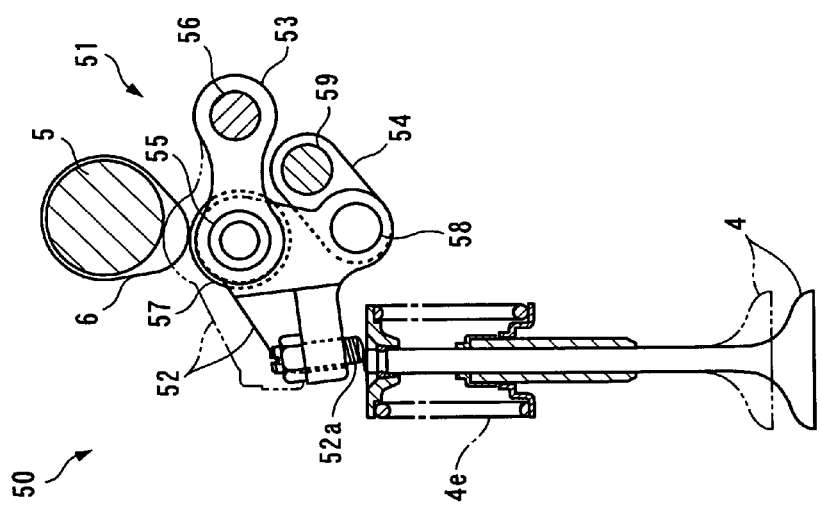

F I G. 2 1
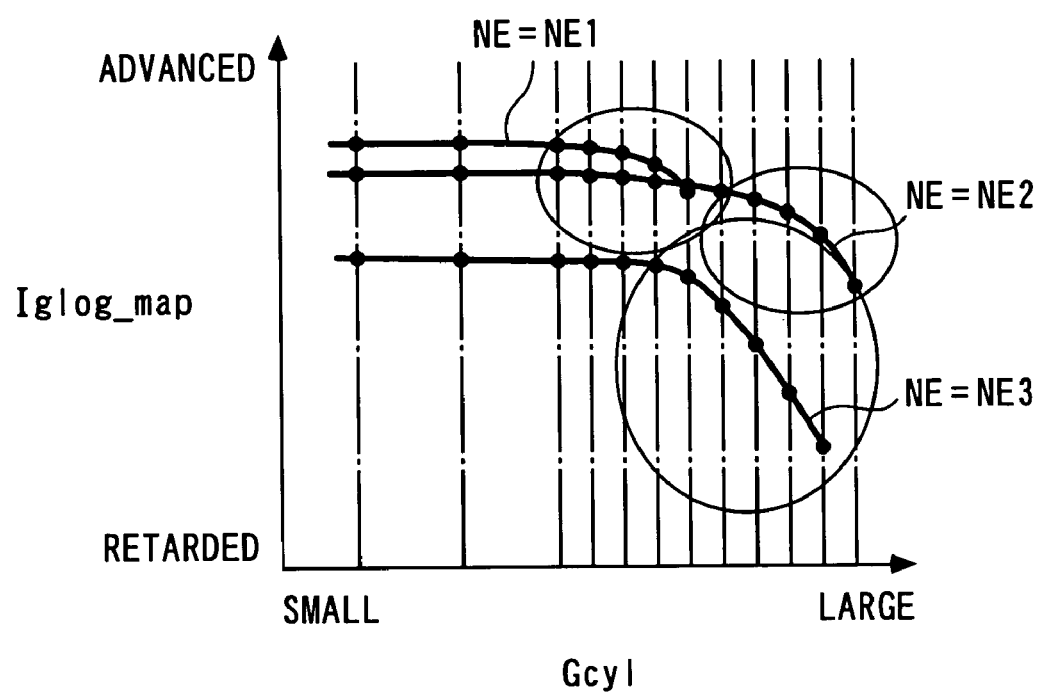

CONTROL SYSTEM FOR INTERNAL COMBUSTION ENGINE

FIELD OF THE INVENTION

The present invention relates to a control system for an internal combustion engine in which a variable intake mechanism changes the amount of intake air drawn into cylinders as desired, the control system controlling a fuel amount and ignition timing of the engine.

BACKGROUND ART

Conventionally, a control system for an internal combustion engine in which a variable intake mechanism changes the amount of intake air drawn into cylinders as desired has been proposed in Patent Literature 1. This control system controls the amount of intake air (intake air amount) by the variable intake mechanism, and is comprised of an air flow sensor for detecting the flow rate of air flowing through an intake passage of the engine, a crank angle sensor for detecting a state of rotation of a crankshaft, an accelerator pedal opening sensor for detecting an opening of an accelerator pedal (hereinafter referred to as "the accelerator pedal opening"), and a controller to which are inputted detection signals from these sensors. The controller calculates an engine speed based on the detection signal from the crank angle sensor, and the intake air amount based on the detection signal from the air flow sensor. Further, the engine is provided with a throttle valve mechanism and a variable valve lift mechanism as variable intake mechanisms. The throttle valve mechanism changes the flow rate of air flowing through the intake passage as desired, and the variable valve lift mechanism changes the lift of each intake valve (hereinafter referred to as "the valve lift") as desired.

As will be described hereinafter, in the control system, the intake air amount is controlled by the controller. First, it is determined based on the engine speed, the accelerator pedal opening, and the intake air amount, in what operating load region the engine is. Then, when it is determined that the engine is in a low-engine speed and low-load region including an idling region, the valve lift is controlled to a predetermined low lift by the variable valve lift mechanism, and the opening of the throttle valve is controlled to a value corresponding to the engine speed and the accelerator pedal opening by the throttle valve mechanism. On the other hand, when it is determined that the engine is between a medium-engine speed and medium-load region and a high-engine speed and high-load region, the throttle valve is controlled to a fully-open state, and the valve lift is controlled to a value corresponding to the engine speed and the accelerator pedal opening.

[Patent Literature 1] Japanese Laid-Open Patent Publication (Kokai) No. 2003-254100

In the above conventional control system, it is sometimes impossible to properly calculate the intake air amount, due to a low resolution of the air flow sensor. For example, some type of internal combustion engine has an intake passage whose diameter is set to a large value (i.e. which is configured to have a large diameter) so as to reduce flow resistance within the intake passage to enhance the charging efficiency of intake air in cylinders. When the conventional control system is applied to the engine configured as above, the flow velocity of intake air assumes a very low value when the engine is in a low-engine speed and low-load region, and hence the conventional control system cannot properly calculate the intake air amount due to the low resolution of the air flow sensor, which degrades the accuracy of the intake air amount control. As a result, when the amount of fuel to be supplied to a combustion chamber is controlled based on the intake air amount thus calculated, there is a fear that the resulting degraded control accuracy lowers fuel economy and increases exhaust emissions. Furthermore, since the engine to which the conventional control system is applied is provided with the throttle valve mechanism, this causes an increase in the flow resistance within the intake passage.

Further, in a high-load region of the engine, the reliability of the intake air amount calculated based on the detection signal from the air flow sensor is sometimes degraded, due to occurrence of intake pulsation or an excessively high flow velocity of the intake air. In such a case as well, the above described problems are brought about.

On the other hand, in the ignition control of the engine, a method is conventionally employed which uses an engine speed and an intake air amount as load parameters indicative of load on the engine, and ignition timing maps having map values of ignition timing set in advance in association with the load parameters. In the above-described engine with the intake air passage having a large diameter as well, it is envisaged that ignition timing is controlled by the above method. However, as described above, in the conventional control system, the intake air amount cannot be properly calculated in the low-load region of the engine due to the low resolution of the air flow sensor. This degrades the accuracy of the ignition timing control. Further, the charging efficiency of intake air in the cylinders varies with the engine speed, causing the maximum value of the intake air amount in the high-load region where knocking starts to occur to also vary with the engine speed. Therefore, in the high-load region of the engine, it is necessary to set the number of set values of the intake air amount and the maximum values of the same in a fine-grained manner while making them different from each other. This causes an increase in the number of data of the ignition timing maps to increase the number of times of measurement for sampling the data as well as the capacity of a storage medium, such as a ROM, resulting in increased manufacturing costs. Moreover, the accuracy of the ignition timing control is degraded also in the engine in which the reliability of the intake air amount calculated based on the detection signal from the air flow sensor lowers in the high-load region of the engine, as described above.

The present invention has been made to provide a solution to the above-described problems, and an object thereof is to provide a control system for an internal combustion engine, which is capable of enhancing the accuracy of fuel control and ignition timing control even when there is a possibility that the reliability of a calculated intake air amount lowers, and enables reduction of manufacturing costs.

DISCLOSURE OF THE INVENTION

To attain the above object, in a first aspect of the present invention, there is provided a control system for an internal combustion engine in which a variable intake mechanism changes an amount of intake air drawn into cylinders thereof as desired, the control system controlling an amount of fuel to be supplied to a combustion chamber, comprising operating condition parameter-detecting means for detecting an operating condition parameter indicative of an operating condition of the variable intake mechanism, first estimated intake air amount-calculating means for calculating a first estimated intake air amount as an estimated value of the amount of intake air according to the operating condition parameter, air flow rate-detecting means for detecting a flow rate of air flowing through an intake passage of the engine, second estimated intake air amount-calculating means for calculating a second estimated intake air amount as an estimated value of the amount of intake air according to the flow rate of air, load parameter-detecting means for detecting a load parameter indicative of load on the engine, and fuel amount-determining means for determining the amount of fuel according to the first estimated intake air amount when the load parameter is within a first predetermined range, and determining the amount of fuel according to the second estimated intake air amount when the load parameter is within a second predetermined range different from the first predetermined range.

With the configuration of this control system, a first estimated intake air amount is calculated as an estimated value of the amount of intake air according to an operating condition parameter indicative of an operating condition of a variable intake mechanism; a second estimated intake air amount is calculated as an estimated value of the amount of the intake air according to the flow rate of air flowing through an intake passage of the engine; and the amount of fuel to be supplied to a combustion chamber is determined according to the first estimated intake air amount when a load parameter indicative of load on the engine is within a first predetermined range. Therefore, by setting the first predetermined range to a load region where the reliability of the first estimated intake air amount exceeds the reliability of the second estimated intake air amount due to lowering of the reliability of the flow rate of air detected by air flow rate-detecting means, it is possible, even in such a load region, to properly determine the amount of fuel according to the first estimated intake air amount. For example, in the case of an engine which has an intake passage formed to have a large diameter, the flow rate of air assumes a very small value in a low-load region of the engine, so that the reliability of the first estimated intake air amount exceeds the reliability of the second estimated intake air amount, and hence it is only required to set the first predetermined range to the low-load region of the engine. On the other hand, in the case of an engine in which in a high-load region thereof, the reliability of the first estimated intake air amount exceeds that of the second estimated intake air amount due to occurrence of intake pulsation or an excessively high flow velocity of intake air, it is only required to set the first predetermined range to the high-load region of the engine.

Further, when the load parameter is in a second predetermined range different from the first predetermined range, the amount of fuel to be supplied to the combustion chamber is determined according to a detected flow rate of air, and hence by setting the second predetermined range to a load region where the reliability of the second estimated intake air amount exceeds that of the first estimated intake air amount, it is possible, even in such a load region, to properly determine the fuel amount according to the second estimated intake air amount. As described above, since it is possible to properly determine the fuel amount not only in a load region where the reliability of the first estimated intake air amount exceeds that of the second estimated intake air amount but also in a load region opposite thereto, it is possible to enhance the accuracy of fuel control, that is, the accuracy of air-fuel ratio control. As a result, it is possible to improve fuel economy and reduce exhaust emissions (It should be noted throughout the specification, "to detect the operating condition parameter", "to detect the load parameter", and "to detect the flow rate of air" includes not only to detect the operating condition parameter, the load parameter, and the flow rate of air directly by sensors but also to calculate or estimate the same).

Preferably, the first predetermined range and the second predetermined range are set such that they do not overlap each other, and the fuel amount-determining means determines the amount of fuel according to the first estimated intake air amount and the second estimated intake air amount when the load parameter is between the first predetermined range and the second predetermined range.

With the configuration of this preferred embodiment, when the load parameter is between the first predetermined range and the second predetermined range, the fuel amount is determined according to the first estimated intake air amount and the second estimated intake air amount. Therefore, differently from the case where the estimated value of the intake air amount used for determination of the fuel amount is directly switched from one of the first and second estimated intake air amounts to the other, it is possible to avoid occurrence e.g. of a torque step caused by a change in the fuel amount, whereby it is possible to enhance drivability.

Preferably, the control system further comprises first failure-determining means for determining whether or not the air flow rate-detecting means is faulty, and the fuel amount-determining means calculates the amount of fuel according to the first estimated intake air amount irrespective of a value of the load parameter, when the first failure-determining means determines that the air flow rate-detecting means is faulty.

With the configuration of this preferred embodiment, when the air flow rate-detecting means is determined to be faulty, the fuel amount is calculated according to the first estimated intake air amount irrespective of a value of the load parameter, and hence even when the reliability of the second estimated intake air amount lowers due to the failure of the air flow rate-detecting means, the fuel amount can be properly calculated according to the first estimated intake air amount, thereby making it possible to ensure excellent accuracy of the fuel control.

Preferably, the control system further comprises second failure-determining means for determining whether or not the variable intake mechanism is faulty, and drive means for driving the variable intake mechanism such that the amount of intake air becomes equal to a predetermined value, when the second failure-determining means determines that the variable intake mechanism is faulty, and the fuel amount-determining means determines the amount of fuel according to the predetermined value, when the second failure-determining means determines that the variable intake mechanism is faulty.

With the configuration of this preferred embodiment, when the variable intake mechanism is determined to be faulty, the variable intake mechanism is driven such that the amount of the intake air becomes equal to a predetermined value, and the fuel amount is determined according to a predetermined value. Therefore, by setting the predetermined value to an appropriate value, it is possible to continue driving of a vehicle while avoiding acceleration of the engine due to an increase in the power output of the engine, and deceleration due to a decrease in the engine speed. This makes it possible to ensure minimum required running performance of the vehicle when the engine is used as a drive source of the vehicle.

To attain the above object, in a second aspect of the present invention, there is provided a control system for an internal combustion engine, comprising intake air amount-calculating means for calculating an amount of intake air drawn into cylinders of the engine, engine speed-detecting means for detecting a rotational speed of the engine, maximum intake air amount-calculating means for calculating a maximum amount of intake air which can be drawn into each cylinder at the rotational speed of the engine, according to the rotational speed of the engine, and ignition timing-determining means for determining ignition timing of the engine according to a ratio of the intake air amount to the maximum intake air amount or a ratio of the maximum intake air amount to the intake air amount, and the rotational speed of the engine.

With the configuration of this control system, since ignition timing of the engine is determined according to a ratio between the intake air amount and the maximum intake air amount, and the engine speed, it is possible to determine the ignition timing using an ignition timing map set in association with the ratio and the engine speed. When the ignition timing is determined as above, the ratio of the intake air amount to the maximum intake air amount or the ratio of the maximum intake air amount to the intake air amount assumes a value within the range of 0 to 1, or a value within the range of 1 to infinite. Further, in a high-load region where the intake air amount assumes a value close to the maximum intake air amount and knocking is liable to occur, the ratio becomes equal to 1 or close thereto, and hence is prevented from being varied with respect to a plurality of different set values of the engine speed. Therefore, when data of the ignition timing map are set in association with the engine speed and the ratio, the number of set data can be made equal with respect to the ratio between a plurality of set values of the engine speed, and hence compared with the prior art in which data in the ignition timing map are set in association with the engine speed and the intake air amount, it is possible to reduce the total number of data, and accordingly reduce the storage capacity of a storage medium, such as a ROM, thereby making it possible reduce the manufacturing costs of the control system.

Preferably, the engine includes a variable intake mechanism for changing the amount of intake air as desired, the control system further comprising operating condition parameter-detecting means for detecting an operating condition parameter indicative of an operating condition of the variable intake mechanism, air flow rate-detecting means for detecting a flow rate of air flowing through an intake passage of the engine, and load parameter-detecting means for detecting a load parameter indicative of load on the engine, and the intake air amount-calculating means calculates the amount of intake air according to the operating condition parameter when the load parameter is within a first predetermined range, and calculates the amount of intake air according to the flow rate of air when the load parameter is within a second predetermined range different from the first predetermined range.

With the configuration of this preferred embodiment, the amount of the intake air is calculated according to the operating condition parameter indicative of the operating condition of the variable intake mechanism when the load parameter is within a first predetermined range, and when the load parameter is within a second predetermined range different from the first predetermined range, the amount of the intake air is calculated according to the flow rate of air flowing through an intake passage of the engine. The ignition timing is determined according to the thus calculated amount of the intake air. Therefore, by setting the first predetermined range to a load region where the reliability of a detection value of the operating condition parameter exceeds the reliability of a detection value of the flow rate of the air, causing the reliability of an intake air amount calculated according to the operating condition parameter to exceed the reliability of an intake air amount calculated according to the flow rate of the air, it is possible, even in such a load region, to properly determine the ignition timing according to the intake air amount. For example, as described above, in the case of an engine which has an intake passage formed to have a large diameter, it is only required to set the first predetermined range to the low-load region of the engine, whereas in the case of an engine in which in a high-load region thereof, the reliability of the detection value of the flow rate of the air becomes lower than that of the detection value of the operating condition parameter, it is only required to set the first predetermined range to the high-load region of the engine.

Furthermore, when the load parameter is within a second predetermined range different from the first predetermined range, the amount of intake air is calculated according to the flow rate of air, so that by setting the second predetermined range to a load region where the reliability of the flow rate of air exceeds that of the operating condition parameter, causing the reliability of an intake air amount calculated according to the flow rate of air to exceed that of an intake air amount calculated according to the operating condition parameter, it is possible, even in such a load region, to properly determine the ignition timing according to the intake air amount. As described above, since the ignition timing can be properly determined not only in the load region where the reliability of an intake air amount calculated according to the flow rate of air exceeds the reliability of an intake air amount calculated according to the operating condition parameter but also in a load region opposite thereto, it is possible to enhance the accuracy of ignition timing control. As a result, it is possible to improve fuel economy and combustion stability.

More preferably, the first predetermined range and the second predetermined range are set such that they do not overlap each other, and the intake air amount-calculating means calculates the amount of intake air according to the operating condition parameter and the flow rate of air when the load parameter is between the first predetermined range and the second predetermined range.

With the configuration of this preferred embodiment, the amount of the intake air is calculated according to the operating condition parameter and the flow rate of the air when the load parameter is between the first predetermined range and the second predetermined range, and hence differently from the case where the intake air amount used for determination of the ignition timing is directly switched from one of a value calculated according to the flow rate of air and a value calculated according to the operating condition parameter to the other of the same, it is possible to avoid occurrence e.g. of a torque step caused by a change in the ignition timing, and thereby enhance drivability.

More preferably, the control system further comprises first failure-determining means for determining whether or not the air flow rate-detecting means is faulty, and the intake air amount-calculating means calculates the amount of intake air according to the operating condition parameter irrespective of a value of the load parameter, when the first failure-determining means determines that the air flow rate-detecting means is faulty.

With the configuration of this preferred embodiment, when the air flow rate-detecting means is determined to be faulty, the amount of intake air is calculated according to the operating condition parameter irrespective of the value of the load parameter. Therefore, even when the reliability of the detection value of the flow rate of the air lowers due to the failure of the air flow rate-detecting means, the ignition timing can be properly calculated, thereby making it possible to ensure excellent control accuracy of the ignition timing control.

More preferably, the control system further comprises second failure-determining means for determining whether or not the variable intake mechanism is faulty, drive means for driving the variable intake mechanism such that the amount of intake air becomes equal to a predetermined value, when the second failure-determining means determines that the variable intake mechanism is faulty, and failure-time target engine speed-setting means for setting a failure-time target engine speed as a target of the rotational speed of the engine, when the second failure-determining means determines that the variable intake mechanism is faulty, and the ignition timing-determining means determines the ignition timing with a predetermined feedback control algorithm such that the rotational speed of the engine becomes equal to the failure-time target engine speed, when the second failure-determining means determines that the variable intake mechanism is faulty.

With the configuration of this preferred embodiment, when the variable intake mechanism is determined to be faulty, the variable intake mechanism is driven such that the amount of intake air becomes equal to a predetermined value, and the ignition timing is determined with a predetermined feedback control algorithm such that the engine speed becomes equal to a failure-time target engine speed. Therefore, by setting the predetermined value and the failure-time target engine speed to respective appropriate values, it is possible to continue driving of the vehicle while avoiding acceleration due to an increase in the engine speed, and deceleration due to a decrease in the engine speed. This makes it possible to ensure minimum required running performance of the vehicle when the engine is used as a drive source of the vehicle.

In the aforementioned first aspect and the second aspect of the present invention, preferably, the variable intake mechanism comprises at least one of a variable cam phase mechanism for changing a phase of an intake camshaft of the engine with respect to a crankshaft of the engine, a variable valve lift mechanism for changing a lift of each intake valve of the engine, and a variable compression ratio mechanism for changing a compression ratio of the engine.

With the configuration of this preferred embodiment, the variable intake mechanism includes at least one of a variable cam phase mechanism for changing a phase of an intake camshaft of the engine with respect to a crankshaft of the engine, a variable valve lift mechanism for changing a lift of each intake valve of the engine, and a variable compression ratio mechanism for changing a compression ratio of the engine, so that it is possible to omit a throttle valve mechanism, thereby making it possible not only to reduce flow resistance within the intake passage to enhance charging efficiency but also to reduce the manufacturing costs of the control system.

BRIEF DESCRIPTION OF THE DRAWINGS

FIG. 1 is a diagram schematically showing the arrangement of an internal combustion engine to which is applied a control system according to an embodiment of the present invention;

FIG. 2 is a block diagram schematically showing the arrangement of the control system;

FIG. 3 is a cross-sectional view schematically showing the arrangement of a variable intake valve-actuating mechanism and an exhaust valve-actuating mechanism of the engine;

FIG. 4 is a cross-sectional view schematically showing the arrangement of a variable valve lift mechanism of the variable intake valve-actuating mechanism;

[FIG. 6]
FIG. 6($a$) is a diagram showing an intake valve placed in an open state when a lower link of the variable valve lift mechanism is in a maximum lift position, and FIG. 6($b$) is a diagram showing the intake valve placed in an open state when the lower link of the variable valve lift mechanism is in a minimum lift position;

FIG. 7 is a diagram showing a valve lift curve (solid line) which the valve lift of the intake valve assumes when the lower link of the variable valve lift mechanism is in the maximum lift position, and a valve lift curve (two-dot chain line) which the valve lift of the intake valve assumes when the lower link of the variable valve lift mechanism is in the minimum lift position;

FIG. 8 is a diagram schematically showing the arrangement of a variable cam phase mechanism;

FIG. 9 is a diagram showing a valve lift curve (solid line) which the valve lift of the intake valve assumes when a cam phase is set to a most retarded value by the variable cam phase mechanism, and a valve lift curve (two-dot chain line) which the valve lift of the intake valve assumes when the cam phase is set to a most advanced value by the variable cam phase mechanism;

FIG. 11 is a block diagram schematically showing the arrangement of a fuel injection controller;

FIG. 12 is a diagram showing an example of a map for use in calculation of a basic estimated intake air amount Gcyl_vt_base;

FIG. 13 is a diagram showing an example of a map for use in calculation of a correction coefficient K_gcyl_vt;

FIG. 14 is a diagram showing an example of a table for use in calculation of a compression ratio correction coefficient K_gcyl_cr;

FIG. 15 is a diagram showing an example of a table for use in calculation of a transition coefficient Kg;

FIG. 16 is a block diagram schematically showing the arrangement of an ignition timing controller;

FIG. 17 is a diagram showing an example of a table for use in calculation of a maximum estimated intake air amount Gcyl_max;

FIG. 18 is a diagram showing an example of a map for use in calculation of a correction coefficient K_gcyl_max;

FIG. 19 is a diagram showing an example of a basic ignition timing map for use when Cr=Crmin & Cain=Cainrt;

FIG. 20 is a diagram showing an example of a basic ignition timing map for use when Cr=Crmin & Cain=Cainad;

[FIG. 21]

FIG. 21 is a diagram showing a comparative example of a basic ignition timing map set by using a calculated intake air amount Gcyl and an engine speed NE as parameters;

FIG. 22 is a flowchart showing a fuel injection control process;

FIG. 23 is a flowchart showing a process for calculation of a basic fuel injection amount Tcyl_bs;

FIG. 24 is a flowchart showing an ignition timing control process;

FIG. 25 is a flowchart showing a normal ignition timing control process;

FIG. 26 is a flowchart showing a variable mechanism control process;

FIG. 27 is a diagram showing an example of a table for use in calculation of a target valve lift Liftin_cmd during starting of the engine;

FIG. 28 is a diagram showing an example of a table for use in calculation of a target cam phase Cain_cmd during starting of the engine;

FIG. 29 is a diagram showing an example of a map for use in calculation of a target valve lift Liftin_cmd during catalyst warmup control;

FIG. 30 is a diagram showing an example of a map for use in calculation of a target cam phase Cain_cmd during the catalyst warmup control;

FIG. 31 is a diagram showing an example of a map for use in calculation of a target valve lift Liftin_cmd during normal operation of a vehicle;

FIG. 32 is a diagram showing an example of a map for use in calculation of the target cam phase Cain_cmd during the normal operation of the vehicle;

FIG. 33 is a diagram showing an example of a map for use in calculation of a target compression ratio Cr_cmd during the normal operation of the vehicle; and

FIG. 34 is a flowchart showing a failure-determining process for determining failure of any of the variable valve lift mechanism, the variable cam phase mechanism, the variable compression ratio mechanism, and the air flow sensor.

BEST MODE FOR CARRYING OUT THE INVENTION

Figure 2:
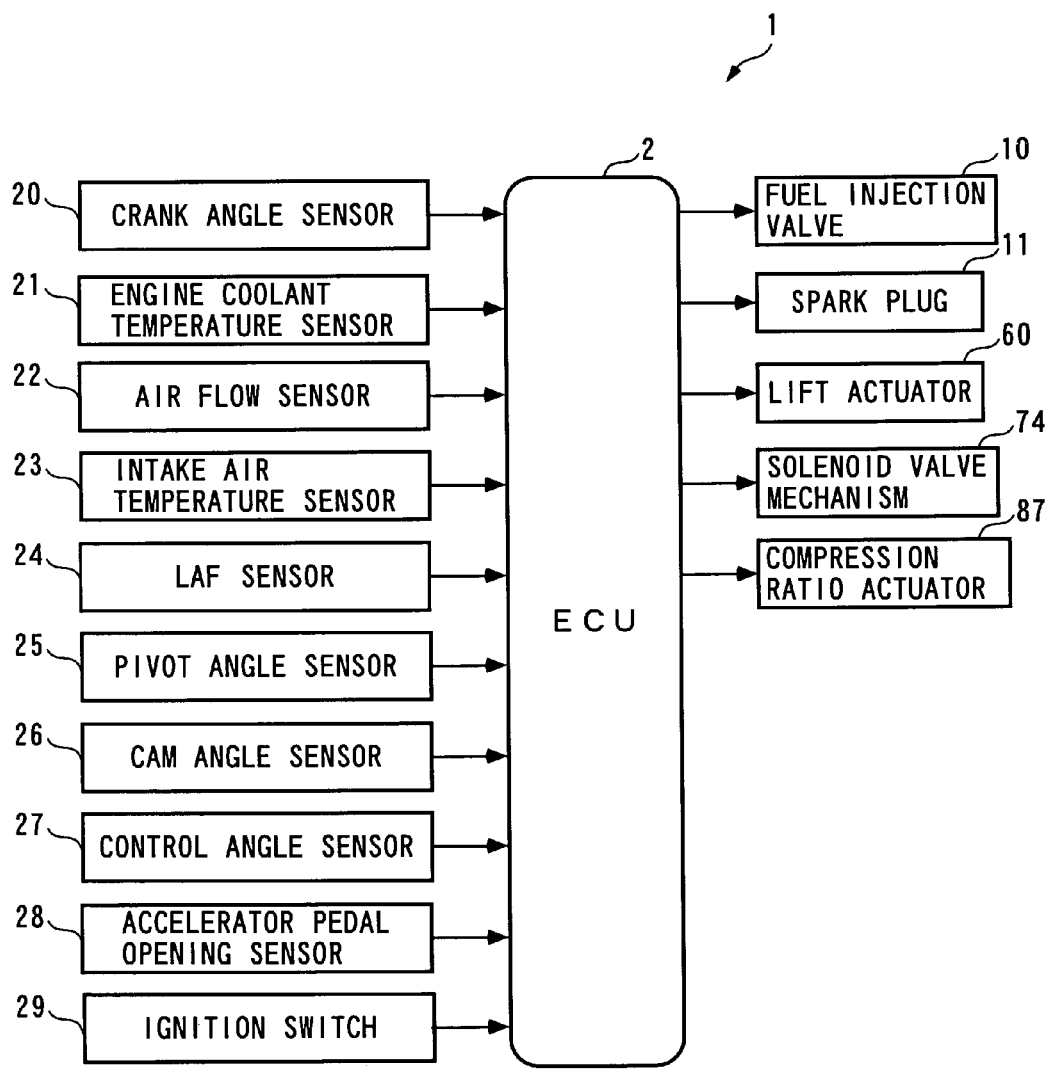
[FIG. 2]

Hereafter, a control system according an embodiment of the present invention will be described with reference to the drawings. The control system 1 includes an ECU 2, as shown in FIG. 2. As described hereinafter, the ECU 2 carries out control processes, including a fuel injection control process and an ignition timing control process, depending on operating conditions of an internal combustion engine (hereinafter simply referred to as "the engine") 3.

Figure 1:
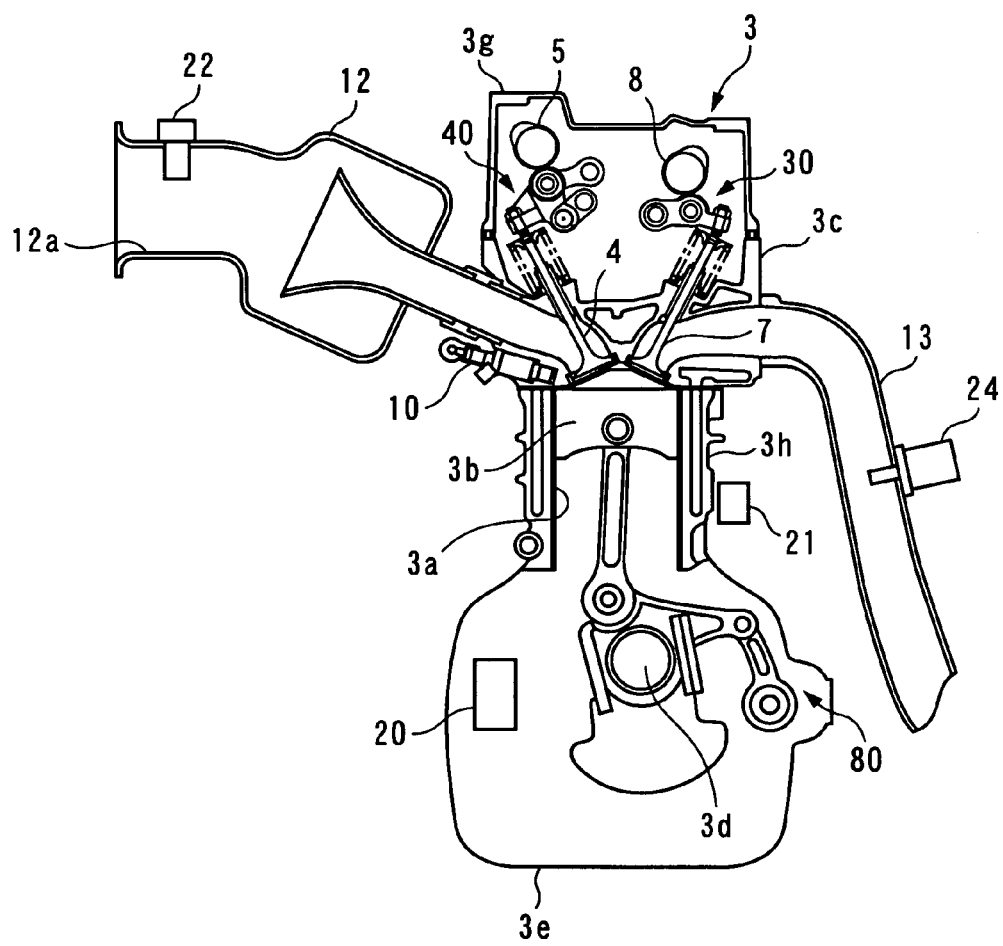
[FIG. 1]
Figure 3:
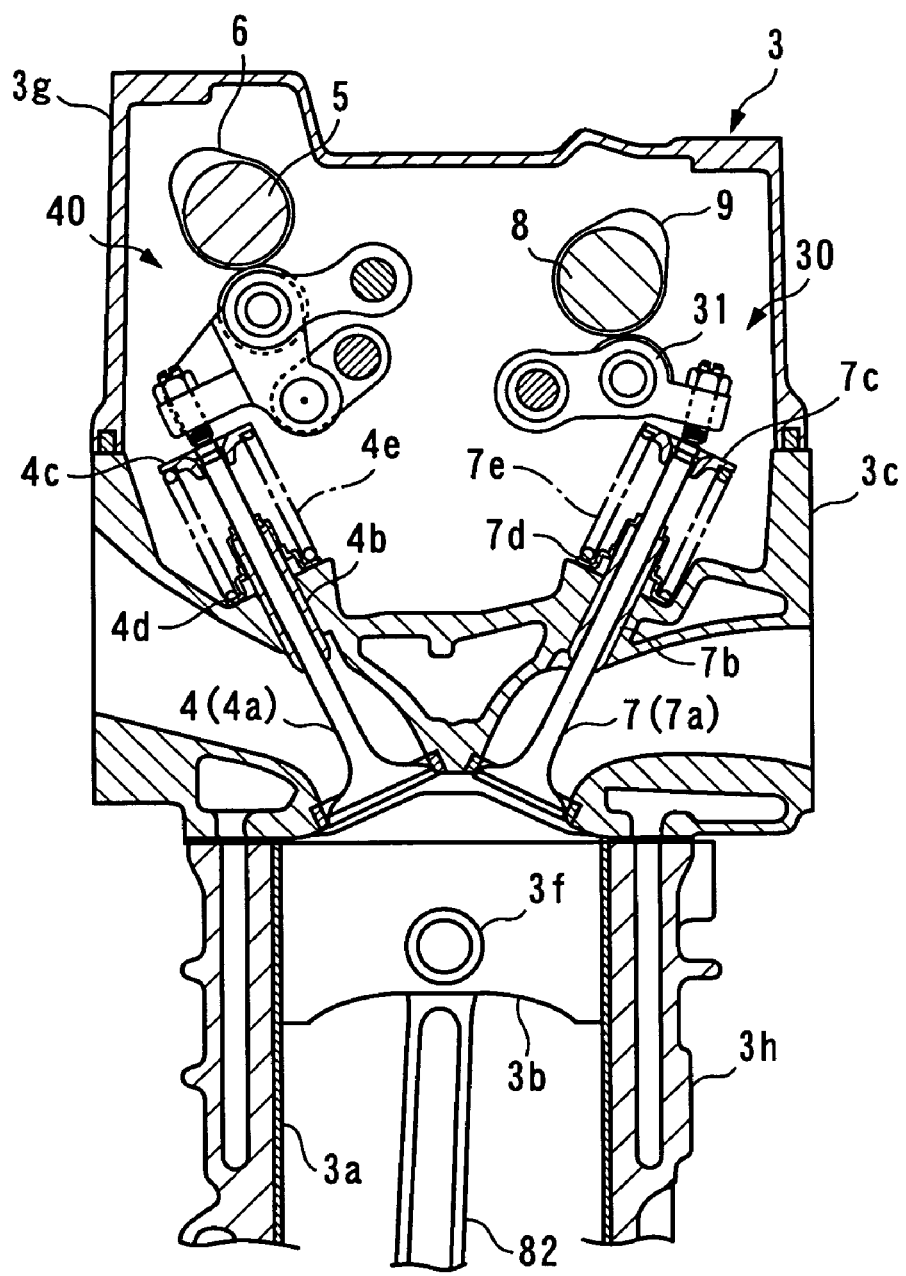
[FIG. 3]

Referring to FIGS. 1 and 3, the engine 3 is an in-line multi-cylinder gasoline engine having a multiplicity of pairs of cylinders 3a and pistons 3b (only one pair of which is shown), and installed on a vehicle, not shown, provided with an automatic transmission. The engine 3 includes an intake valve 4 and an exhaust valve 7 provided for each cylinder 3a, for opening and closing an intake port and an exhaust port thereof, respectively, an intake camshaft 5 and intake cams 6 that actuate the intake valves 4, a variable intake valve-actuating mechanism 40 that actuates the intake valves 4 to open and close the same, an exhaust camshaft 8 and exhaust cams 9 that actuate the exhaust valves 7, an exhaust valve-actuating mechanism 30 that actuates the exhaust valves 7 to open and close the same, a variable compression ratio mechanism 80 for changing a compression ratio, fuel injection valves 10, spark plugs 11 (see FIG. 2), and so forth. It should be noted that in the following description, the engine 3 is assumed to be an in-line four-cylinder engine.

Figure 4:
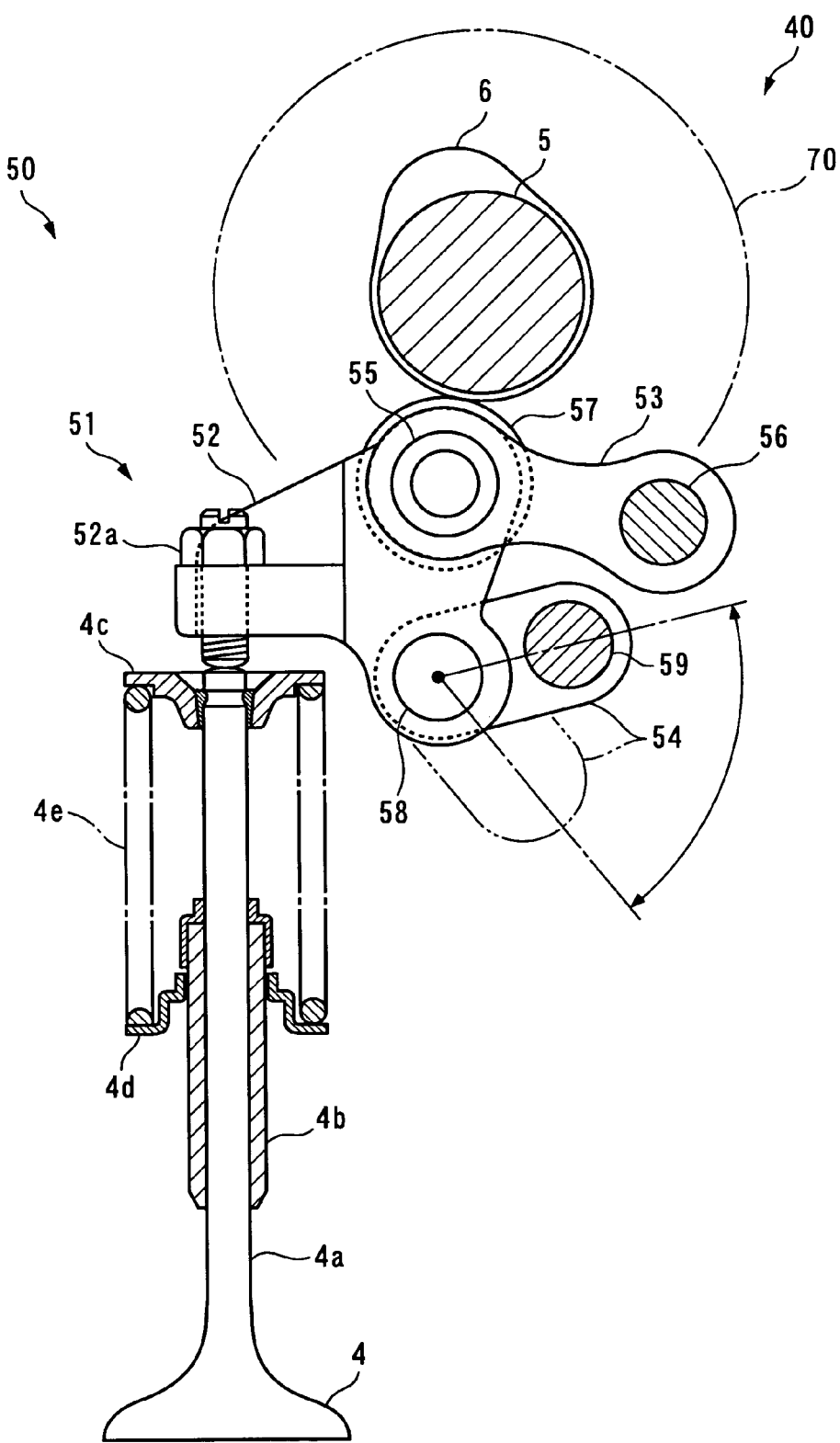
[FIG. 4]

The intake valve 4 has a stem 4a thereof slidably fitted in a guide 4b. The guide 4b is rigidly fixed to a cylinder head 3c. Further, as shown in FIG. 4, the intake valve 4 includes upper and lower spring sheets 4c and 4d, and a valve spring 4e disposed therebetween, and is urged by the valve spring 4e in the valve-closing direction.

Further, the intake camshaft 5 and the exhaust camshaft 8 are rotatably mounted through the cylinder head 3c via holders, not shown. The intake camshaft 5 has an intake sprocket (not shown) coaxially and rotatably fitted on one end thereof. The intake sprocket is connected to a crankshaft 3d via a timing belt, not shown, and connected to the intake camshaft 5 via a variable cam phase mechanism 70, described hereinafter. With the above configuration, the intake camshaft 5 performs one rotation per two rotations of the crankshaft 3d. Further, the intake cam 6 is provided on the intake camshaft 5 for each cylinder 3a such that the intake cam 6 rotates in unison with the intake camshaft 5.

Furthermore, the variable intake valve-actuating mechanism 40 is provided for actuating the intake valve 4 of each cylinder 3a so as to open and close the same, in accordance with rotation of the intake camshaft 5, and continuously changing the lift and the valve timing of the intake valve 4, which will be described in detail hereinafter. It should be noted that in the present embodiment, "the lift of the intake valve 4" (hereinafter referred to as "the valve lift") represents the maximum lift of the intake valve 4.

On the other hand, the exhaust valve 7 has a stem 7a thereof slidably fitted in a guide 7b. The guide 7b is rigidly fixed to the cylinder head 3c. Further, the exhaust valve 7 includes upper and lower spring sheets 7c and 7d, and a valve spring 7e disposed therebetween, and is urged by the valve spring 7e in the valve-closing direction.

Further, the exhaust camshaft 8 has an exhaust sprocket (not shown) integrally formed therewith, and is connected to the crankshaft 3d by the exhaust sprocket and a timing belt, not shown, whereby the exhaust camshaft 8 performs one rotation per two rotations of the crankshaft 3d. Further, the exhaust cam 9 is provided on the exhaust camshaft 8 for each cylinder 3a such that the exhaust cam 9 rotates in unison with the exhaust camshaft 8.

Further, the exhaust valve-actuating mechanism 30 includes rocker arms 31. Each rocker arm 31 is pivotally moved in accordance with rotation of the associated exhaust cam 9 to thereby actuate the exhaust valve 7 for opening and closing the same against the urging force of the valve spring 7e.

On the other hand, the fuel injection valve 10 is provided for each cylinder 3a, and mounted through the cylinder head 3c in a sloped state such that fuel is directly injected into a combustion chamber. That is, the engine 3 is configured as a direct injection engine. Further, the fuel injection valve 10 is electrically connected to the ECU 2 and the valve-opening time period and the valve-opening timing thereof are controlled by the ECU 2, whereby the fuel injection control is carried out, as will be described hereinafter.

The spark plug 11 as well is provided for each cylinder 3a, and mounted through the cylinder head 3c. The spark plug 11 is electrically connected to the ECU 2, and a state of spark discharge is controlled by the ECU 2 such that a mixture in the combustion chamber is burned in timing corresponding to ignition timing, referred to hereinafter.

On the other hand, the engine 3 is provided with a crank angle sensor 20 and an engine coolant temperature sensor. 21. The crank angle sensor 20 is comprised of a magnet rotor and an MRE (magnetic resistance element) pickup, and delivers a CRK signal and a TDC signal, which are both pulse signals, to the ECU 2 in accordance with rotation of the crankshaft 3d. Each pulse of the CRK signal is generated whenever the crankshaft 3d rotates through a predetermined angle (e.g. 10 degrees). The ECU 2 determines the rotational speed NE of the engine 3 (hereinafter referred to as "the engine speed NE") based on the CRK signal. Further, the TDC signal indicates that each piston 3b in the associated cylinder 3a is in a predetermined crank angle position slightly before the TDC position at the start of the intake stroke, and each pulse of the TDC signal is generated whenever the crankshaft 3d rotates through a predetermined crank angle. In the present embodiment, the crank angle sensor 20 corresponds to load parameter-detecting means and engine speed-detecting means, and the engine speed NE corresponds to a load parameter.

The engine coolant temperature sensor 12 is implemented e.g. by a thermistor, and detects an engine coolant temperature TW to deliver a signal indicative of the sensed engine coolant temperature TW to the ECU 2. The engine coolant temperature TW is the temperature of an engine coolant circulating through a cylinder block 3h of the engine 3.

Furthermore, the engine 3 has an intake pipe 12 from which a throttle valve mechanism is omitted, and an intake passage 12a of which is formed to have a large diameter, whereby the engine 3 is configured such that flow resistance is smaller than in an ordinary engine. The intake pipe 12 is provided with an air flow sensor 22 and an intake air temperature sensor 23 (see FIG. 2).

The air flow sensor 22 (air flow rate-detecting means) is formed by a hot-wire air flow meter, and detects the flow rate Gin of air flowing through the intake passage 12a (hereinafter referred to as "the air flow rate Gin") to deliver a signal indicative of the sensed air flow rate Gin to the ECU 2. It should be noted that the air flow rate Gin is indicated in units of g/sec. Further, the intake air temperature sensor 23 detects the temperature TA of the air flowing through the intake passage 12a (hereinafter referred to as "the intake air temperature TA"), and delivers a signal indicative of the sensed intake air temperature TA to the ECU 2.

A LAF sensor 24 is inserted into an exhaust pipe 13 of the engine 3 at a location upstream of a catalytic device, not shown. The LAF sensor 24 is comprised of a zirconia layer and platinum electrodes, and linearly detects the concentration of oxygen in exhaust gases in a broad air-fuel ratio range from a rich region richer than the stoichiometric ratio to a very lean region, to deliver a signal indicative of the sensed oxygen concentration to the ECU 2. The ECU 2 calculates a detected air-fuel ratio KACT indicative of an air-fuel ratio in the exhaust gases, based on a value of the signal output from the LAF sensor 24. The detected air-fuel ratio KACT is expressed as an equivalent ratio proportional to the reciprocal of the air-fuel ratio.

Next, a description will be given of the aforementioned variable intake valve-actuating mechanism 40. As shown in FIG. 4, the variable intake valve-actuating mechanism 40 is comprised of the intake camshaft 5, the intake cams 6, a variable valve lift mechanism 50, and the variable cam phase mechanism 70.

The variable valve lift mechanism 50 (variable intake mechanism) is provided for actuating the intake valves 4 to open and close the same, in accordance with rotation of the intake camshaft 5, and continuously changing the valve lift Liftin between a predetermined maximum value Liftinmax and a predetermined minimum value Liftinmin. The variable valve lift mechanism 50 is comprised of rocker arm mechanisms 51 of a four joint link type, provided for the respective cylinders 3a, and a lift actuator 60 (see FIGS. 5(a) and 5(b)) simultaneously actuating these rocker arm mechanisms 51.

Each rocker arm mechanism 51 is comprised of a rocker arm 52, and upper and lower links 53 and 54. The upper link 53 has one end pivotally mounted to an upper end of the rocker arm 52 by an upper pin 55, and the other end pivotally mounted to a rocker arm shaft 56. The rocker arm shaft 56 is mounted through the cylinder head 3c via holders, not shown.

Further, a roller 57 is pivotally disposed on the upper pin 55 of the rocker arm 52. The roller 57 is in contact with a cam surface of the intake cam 6. As the intake cam 6 rotates, the roller 57 rolls on the intake cam 6 while being guided by the cam surface of the intake cam 6. As a result, the rocker arm 52 is vertically driven, and the upper link 53 is pivotally moved about the rocker arm shaft 56.

Furthermore, an adjusting bolt 52a is mounted to an end of the rocker arm 52 toward the intake valve 4. When the rocker arm 52 is vertically moved in accordance with rotation of the intake cam 6, the adjusting bolt 52a vertically drives the stem 4a to open and close the intake valve 4, against the urging force of the valve spring 4e.

Further, the lower link 54 has one end pivotally mounted to a lower end of the rocker arm 52 by a lower pin 58, and the other end of the lower link 54 has a connection shaft 59 pivotally mounted thereto. The lower link 54 is connected to a short arm 65, described hereinafter, of the lift actuator 60 by the connection shaft 59.

Figure 5A:
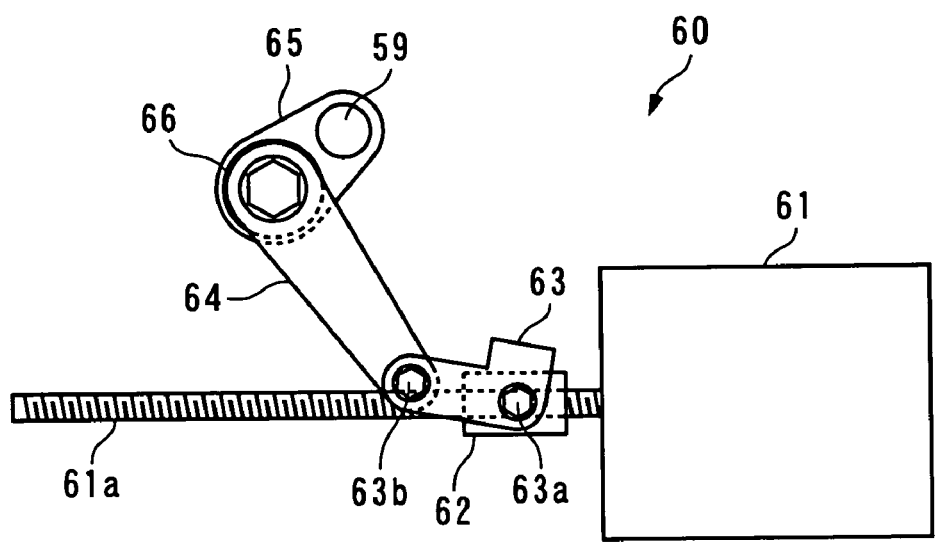
[FIG. 5]
FIG. 5($a$) is a diagram showing a lift actuator in a state in which a short arm thereof is in a maximum lift position, and FIG. 5($b$) is a diagram showing the lift actuator in a state in which the short arm thereof is in a minimum lift position.
Figure 5B:
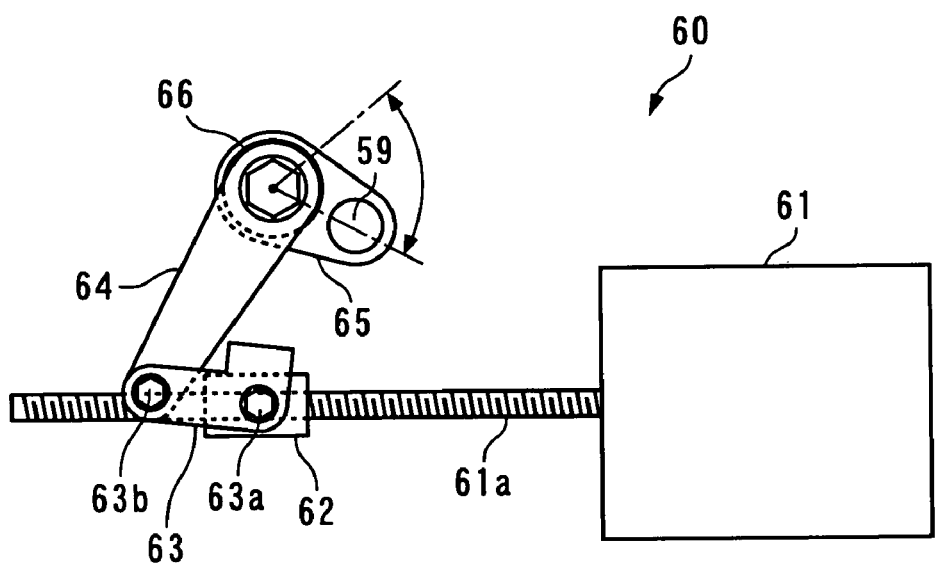

On the other hand, as shown in FIGS. 5A and 5B, the lift actuator 60 is comprised of a motor 61, a nut 62, a link 63, a long arm 64, and the short arm 65. The motor 61 is connected to the ECU 2, and disposed outside a head cover 3g of the engine 3. The rotational shaft of the motor 61 is a screw shaft 61a formed with a male screw and the nut 62 is screwed onto the screw shaft 61a. The nut 62 is connected to the long arm 64 by the link 63. The link 63 has one end pivotally mounted to the nut 62 by a pin 63a, and the other end pivotally mounted to one end of the long arm 64 by a pin 63b.

Further, the other end of the long arm 64 is attached to one end of the short arm 65 by a pivot shaft 66. The pivot shaft 66 is circular in cross section, and extends through the head cover 3g of the engine 3 such that it is pivotally supported by the head cover 3g. The long arm 64 and the short arm 65 are pivotally moved in unison with the pivot shaft 66 in accordance with pivotal motion of the pivot shaft 66.

Furthermore, the aforementioned connection shaft 59 pivotally extends through the other end of the short arm 65, whereby the short arm 65 is connected to the lower link 54 by the connection shaft 59.

Next, a description will be given of operation of the variable valve lift mechanism 50 configured as above. In the variable valve lift mechanism 50, when a lift control input U_Liftin, described hereinafter, is inputted from the ECU 2 to the lift actuator 60, the screw shaft 61a rotates, and the nut 62 is moved in accordance with the rotation of the screw shaft 61a, whereby the long arm 64 and the short arm 65 are pivotally moved about the pivot shaft 66, and in accordance with the pivotal motion of the short arm 65, the lower link 54 of the rocker arm mechanism 51 is pivotally moved about the lower pin 58. That is, the lower link 54 is driven by the lift actuator 60.

In the process, under the control of the ECU 2, the range of pivotal motion of the short arm 65 is restricted between a maximum lift position shown in FIG. 5(a) and a minimum lift position shown in FIG. 5(b), whereby the range of pivotal motion of the lower link 54 is also restricted between a maximum lift position indicated by a solid line in FIG. 4 and a minimum lift position indicated by a two-dot chain line in FIG. 4.

The four joint link formed by the rocker arm shaft 56, the upper and lower pins 55 and 58, and the connection shaft 59 is configured such that when the lower link 54 is in the maximum lift position, the distance between the center of the upper pin 55 and the center of the lower pin 58 becomes longer than the distance between the center of the rocker arm shaft 56 and the center of the connection shaft 59, whereby as shown in FIG. 6(a), when the intake cam 6 rotates, the amount of movement of the adjusting bolt 52a becomes larger than the amount of movement of a contact point where the intake cam 6 and the roller 57 are in contact with each other.

On the other hand, the four joint link is configured such that when the lower link 54 is in the minimum lift position, the distance between the center of the upper pin 55 and the center of the lower pin 58 becomes shorter than the distance between the center of the rocker arm shaft 56 and the center of the connection shaft 59, whereby as shown in FIG. 6(b), when the intake cam 6 rotates, the amount of movement of the adjusting bolt 52a becomes smaller than the amount of movement of the contact point where the intake cam 6 and the roller 57 are in contact with each other.

Figure 7:
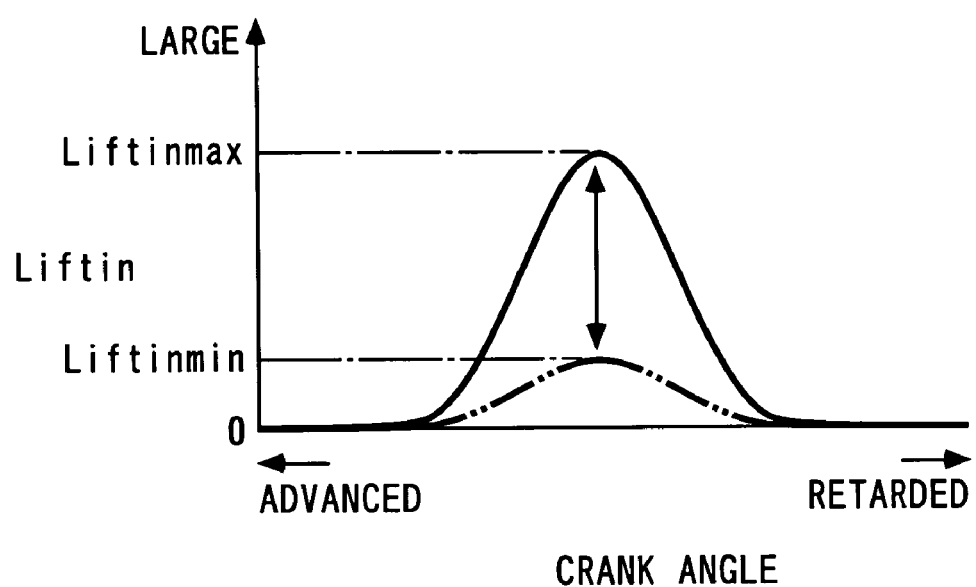
[FIG. 7]

For the above reason, when the lower link 54 is in the maximum lift position, the intake valve 4 is opened with a larger valve lift Liftin than when the lower link 54 is in the minimum lift position. More specifically, during rotation of the intake cam 6, when the lower link 54 is in the maximum lift position, the intake valve 4 is opened according to a valve lift curve indicated by a solid line in FIG. 7, and the valve lift Liftin assumes its maximum value Liftinmax. On the other hand, when the lower link 54 is in the minimum lift position, the intake valve 4 is opened according to a valve lift curve indicated by a two-dot chain line in FIG. 7, and the valve lift Liftin assumes its minimum value Liftinmin.

Therefore, in the variable valve lift mechanism 50, the lower link 54 is pivotally moved by the lift actuator 60 between the maximum lift position and the minimum lift position, whereby it is possible to continuously change the valve lift Liftin between the maximum value Liftinmax and the minimum value Liftinmin.

It should be noted that the variable valve lift mechanism 50 is provided with a lock mechanism, not shown, which locks operation of the variable valve lift mechanism 50 when the lift control input U_Liftin is set to a failure time value U_Liftin_fs, referred to hereinafter, and when the lift control input U_Liftin is not inputted from the ECU 2 to the lift actuator 60 e.g. due to a disconnection. More specifically, the variable valve lift mechanism 50 is inhibited from changing the valve lift Liftin, whereby the valve lift Liftin is held at the minimum value Liftinmin. It should be noted that when a cam phase Cain is held at a locking value, described hereinafter, and at the same time when a compression ratio Cr is held at a minimum value Crmin, the minimum value Liftinmin is set to a value which is capable of ensuring a predetermined failure time value Gcyl_fs, referred to hereinafter, as the intake air amount. The predetermined failure time value Gcyl_fs (predetermined value) is set to a value which is capable of suitably carrying out idling or starting of the engine 3 during stoppage of the vehicle, and at the same time holding the vehicle in a state of low-speed traveling when the vehicle is traveling.

The engine 3 is provided with a pivot angle sensor 25 (see FIG. 2). The pivot angle sensor 25 detects a pivot angle of the pivot shaft 66, i.e. the short arm 65, and delivers a signal indicative of the sensed pivot angle to the ECU 2. The ECU 2 calculates the valve lift Liftin based on the signal output from pivot angle sensor 23. In the present embodiment, the pivot angle sensor 25 corresponds to operating condition parameter-detecting means and the load parameter-detecting means, and the valve lift Liftin corresponds to an operating condition parameter and the load parameter.

Figure 8:
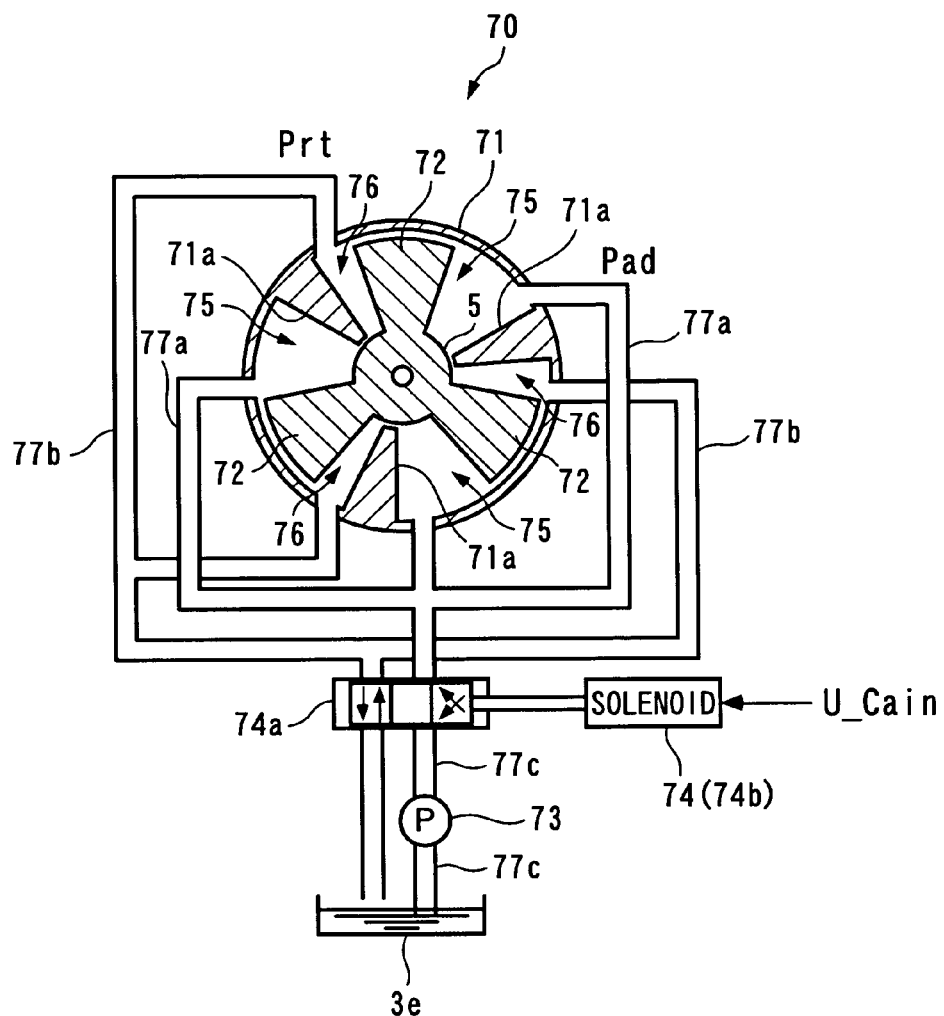
[FIG. 8]

Next, a description will be given of the aforementioned variable cam phase mechanism 70 (variable intake mechanism). The variable cam phase mechanism 70 is provided for continuously advancing or retarding the relative phase Cain of the intake camshaft 5 with respect to the crankshaft 3d (hereinafter referred to as "the cam phase Cain"), and mounted on an intake sprocket-side end of the intake camshaft 5. As shown in FIG. 8, the variable cam phase mechanism 70 includes a housing 71, a three-bladed vane 72, an oil pressure pump 73, and a solenoid valve mechanism 74.

The housing 71 is integrally formed with the intake sprocket on the intake camshaft 5d, and divided by three partition walls 71a formed at equal intervals. The vane 72 is coaxially mounted on the intake sprocket-side end of the intake camshaft 5, such that the vane 72 radially extends outward from the intake camshaft 5, and rotatably housed in the housing 71. Further, the housing 71 has three advance chambers 75 and three retard chambers 76 each formed between one of the partition walls 71a and one of the three blades of the vane 72.

The oil pressure pump 73 is a mechanical one connected to the crankshaft 3d. As the crankshaft 3d rotates, the oil pressure pump 73 draws lubricating oil stored in an oil pan 3e of the engine 3 via a lower part of an oil passage 77c, for pressurization, and supplies the pressurized oil to the solenoid valve mechanism 74 via the remaining part of the oil passage 77c.

The solenoid valve mechanism 74 is formed by combining a spool valve mechanism 74a and a solenoid 74b, and connected to the advance chambers 75 and the retard chambers 76 via an advance oil passage 77a and a retard oil passage 77b such that oil pressure supplied from the oil pressure pump 73 is outputted to the advance chambers 75 and the retard chambers 76 as advance oil pressure Pad and retard oil pressure Prt. The solenoid 74b of the solenoid valve mechanism 74 is electrically connected to the ECU 2. When a phase control input U_Cain, referred to hereinafter, is inputted from the ECU 2, the solenoid 74b moves a spool valve element of the spool valve mechanism 74a within a predetermined range of motion according to the phase control input U_Cain to thereby change both the advance oil pressure Pad and the retard oil pressure Prt.

Figure 9:
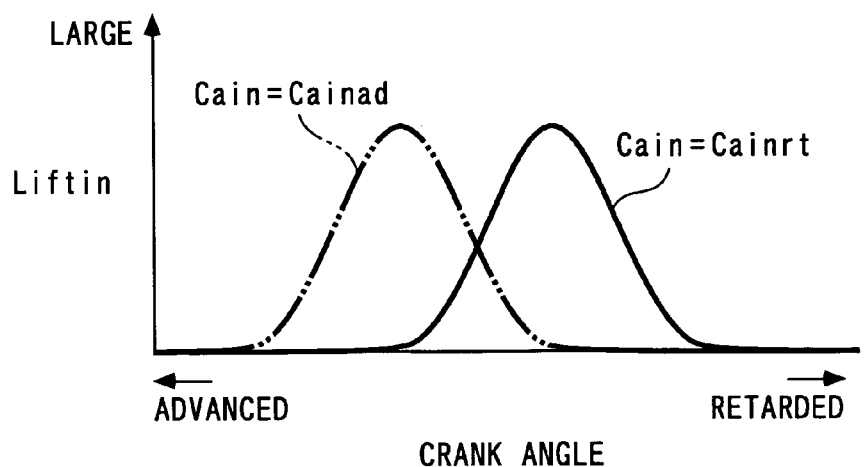
[FIG. 9]

In the variable cam phase mechanism 70 constructed as above, during operation of the oil pressure pump 73, the solenoid valve mechanism 74 is operated according to the phase control input U_Cain, to supply the advance oil pressure Pad to the advance chambers 75 and the retard oil pressure Prt to the retard chambers 76, whereby the relative phase between the vane 72 and the housing 71 is changed toward an advanced side or a retarded side. As a result, the cam phase Cain described above is continuously changed between a most retarded value Cainrt (e.g. a value corresponding to a cam angle of 0 degrees) and a most advanced value Cainad (e.g. a value corresponding to a cam angle of 55 degrees), whereby valve timing of the intake valve 4 is continuously changed between a most retarded timing indicated by a solid line in FIG. 9 and a most advanced timing indicated by a two-dot chain line in FIG. 9.

It should be noted that the variable cam phase mechanism 70 is provided with a lock mechanism, not shown, which locks operation of the variable cam phase mechanism 70 when oil pressure supplied from the oil pressure pump 73 is low, when the phase control input U_Cain is set to a failure time value U_Cain_fs, referred to hereinafter, and when the phase control input U_Cain is not inputted to the solenoid valve mechanism 74 e.g. due to a disconnection. More specifically, the variable cam phase mechanism 70 is inhibited from changing the cam phase Cain, whereby the cam phase Cain is held at a predetermined locking value. As described hereinabove, the predetermined locking value is set to a value which is capable of ensuring the predetermined failure time value Gcyl_fs as the intake air amount when the valve lift Liftin is held at the minimum value Liftinmin, and at the same time when the compression ratio Cr is held at the minimum value Crmin, as described above.

As described above, in the variable intake valve-actuating mechanism 40 used in the present embodiment, the valve lift Liftin is continuously changed by the variable valve lift mechanism 50, and the cam phase Cain, i.e. the valve timing of the intake valve 4 is continuously changed by the variable cam phase mechanism 70 between the most retarded timing and the most advanced timing, described hereinabove. Further, as described hereinafter, the valve lift Liftin and the cam phase Cain are controlled by the ECU 2 via the variable valve lift mechanism 50 and the variable cam phase mechanism 70, respectively.

On the other hand, a cam angle sensor 26 (see FIG. 2) is disposed at an end of the intake camshaft 5 opposite from the variable cam phase mechanism 70. The cam angle sensor 26 is implemented e.g. by a magnet rotor and an MRE pickup, for delivering a CAM signal, which is a pulse signal, to the ECU 2 along with rotation of the intake camshaft 5. Each pulse of the CAM signal is generated whenever the intake camshaft 5 rotates through a predetermined cam angle (e.g. one degree). The ECU 2 calculates the cam phase Cain based on the CAM signal and the CRK signal described above. In the present embodiment, the cam angle sensor 26 corresponds to the operating condition parameter-detecting means and the load parameter-detecting means, and the cam phase Cain corresponds to the operating condition parameter and the load parameter.

Next the aforementioned variable compression ratio mechanism 80 (variable intake mechanism) will be described with reference to FIGS. 10(a) and 10(b). The variable compression ratio mechanism 80 is provided for changing a top dead center position of each piston 3b, that is, the stroke of the piston 3b, to thereby continuously change the compression ratio Cr between a predetermined maximum value Crmax and a predetermined minimum value Crmin, and comprised of a composite link mechanism 81 connected between the piston 3b and the crankshaft 3d, a control shaft 85 for controlling the motion of the composite link mechanism 81, and a compression ratio actuator 87 for driving the control shaft 85.

The composite link mechanism 81 is implemented by an upper link 82, a lower link 83, and a control link 84. The upper link 82 corresponds to a so-called connecting rod, and has an upper end thereof pivotally connected to the piston 3b via a piston pin 3f, and a lower end thereof pivotally connected to an end of the lower link 83 via a pin 83a.

The lower link 83 has a triangular shape. Two ends of the lower link 83 except for the end connected to the upper link 82 are pivotally connected to the crankshaft 3d via a crank pin 83b, and to an end of the control link 84 via a control pin 83c, respectively. With the above configuration, reciprocating motion of the piston 3b is transmitted to the crankshaft 3d via the composite link mechanism 81 such that it is converted into rotating motion of the crankshaft 3d.

Figure 10A:
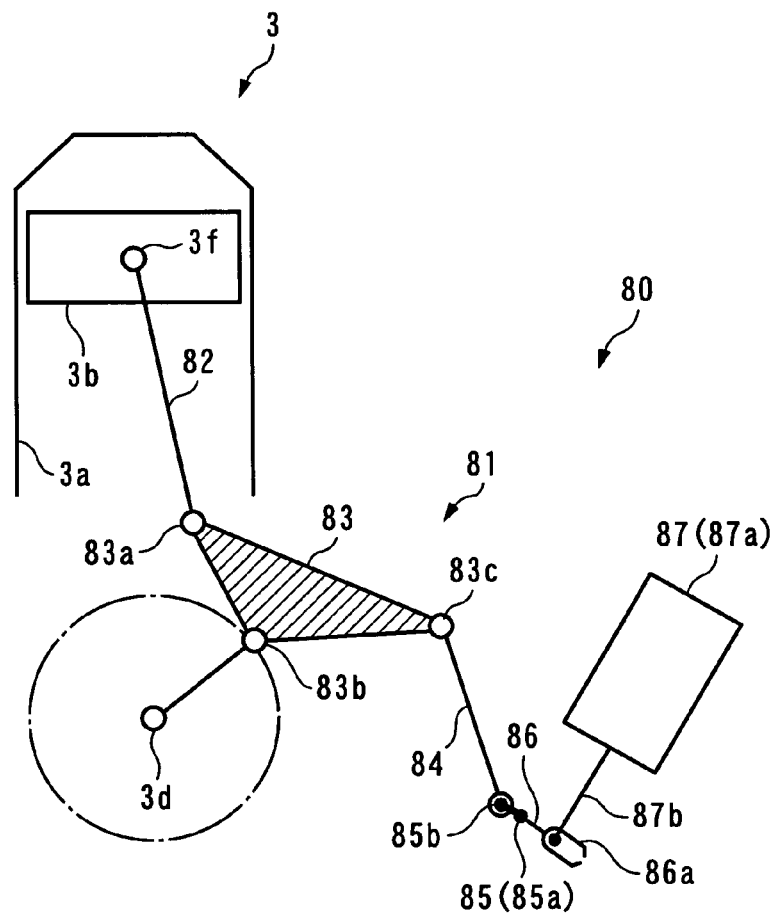
[FIG. 10]
FIG. 10($a$) is a diagram schematically showing the whole arrangement of a variable compression ratio mechanism in a state where a compression ratio is set to a low compression ratio, and FIG. 10($b$) is a diagram schematically showing the arrangement of a control shaft and a compression ratio actuator and their vicinity of the variable compression ratio mechanism in a state where the compression ratio is set to a high compression ratio.
Figure 10B:
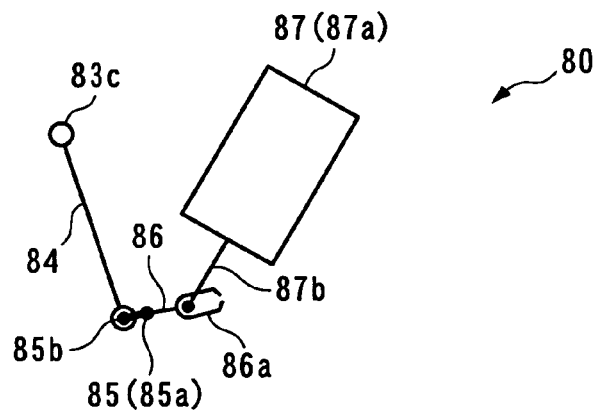

Further, the control shaft 85 extends in the direction of depth (direction perpendicular to the sheet), as viewed in FIGS. 10(a) and 10(b), similarly to the crankshaft 3d, and includes a pivot shaft part 85a pivotally supported by the cylinder block, an eccentric shaft part 85b integrally formed with the pivot shaft part 85a, and arm 86. A lower end of the control link 84 is pivotally connected to the eccentric shaft part 85b. Further, a distal end of the arm 86 is formed as a fork part 86a to which is pivotally connected an end of a drive shaft 87b of the compression ratio actuator 87.

The compression ratio actuator 87 is formed by combining a motor and a reduction mechanism (neither of which is shown), and includes a casing 87a for containing the motor and the reduction mechanism, and a drive shaft 87b movable into and out of the casing 87a. In the compression ratio actuator 87, when the motor is driven for normal or reverse rotation by a compression ratio control input U_Cr, referred to hereinafter, from the ECU 2, the drive shaft 87b is moved between a low compression ratio position (position shown in FIG. 10(a)) where the drive shaft 87b is most protruded from the casing 87a, and a high compression ratio position (position shown in FIG. 10(b)) where the drive shaft 87b is most retracted toward the casing 87a.

With the above configuration, in the variable compression ratio mechanism 80, when the drive shaft 87b of the compression ratio actuator 87 is moved from the low compression ratio position to the high compression ratio position, the control shaft 85 is driven via the arm 86 such that it is pivotally moved counterclockwise as viewed in FIG. 10(a) about the pivot shaft part 85a, and the eccentric shaft part 85b is moved downward along with the pivotal motion of the control shaft 85. As the whole control link 84 is pressed downward by the downward movement of the eccentric shaft part 85b, the lower link 83 is pivotally moved clockwise as viewed in FIG. 10(a) about the crank pin 83b, while the upper link 82 is pivotally moved counterclockwise as viewed in FIG. 10(a) about the piston pin 3f. As a result, the shape formed by the piston pin 3f, the upper pin 83a, and the crank pin 83b are made closer to the shape of a straight line than when they are located at the low compression ratio position, whereby the straight-line distance between the piston 3f and the crank pin 83b, obtained when the piston 3b has reached the top dead center position is increased (which means that the stroke of the piston 3b is increased), to decrease the volume of the combustion chamber, whereby the compression ratio Cr is increased.

On the other hand, inversely to the above, when the drive shaft 87b of the compression ratio actuator 87 is moved from the high compression ratio position to the low compression ratio position, the pivot shaft part 85a is pivotally moved clockwise as viewed in FIG. 10(a), and the eccentric shaft part 85b is moved upward along with the pivotal motion of the pivot shaft part 85a, whereby the whole control link 84 is pushed upward. Thus, quite inversely to the above operations, the lower link 83 is pivotally moved counterclockwise, whereas the upper link 82 is pivotally moved clockwise, as viewed in FIG. 10(*a*). As a result, the straight-line distance between the piston 3*f* and the crank pin 83*b*, obtained when the piston 3*b* has reached the top dead center position is decreased (which means that the stroke of the piston 3*b* is shortened), to increase the volume of the combustion chamber, whereby the compression ratio Cr is reduced. As described above, in the variable compression ratio mechanism 80, by changing the pivot angle of the control shaft 85, the compression ratio Cr is continuously changed between the predetermined maximum value Crmax and the predetermined minimum value Crmin.

It should be noted that the variable compression ratio mechanism 80 includes a lock mechanism, not shown, and when the compression ratio control input U_Cr is set to a failure time value U_Cr_fs, referred to hereinafter, or when the compression ratio control input U_Cr is not inputted to the compression ratio actuator 87 e.g. due to a disconnection, operation of the variable compression ratio mechanism 80 is locked by the lock mechanism. More specifically, the variable compression ratio mechanism 80 is inhibited from changing the compression ratio Cr, whereby the compression ratio Cr is held at the minimum value Crmin. As described hereinabove, the minimum value Crmin is set to a value which is capable of ensuring the predetermined failure time value Gcyl_fs as the intake air amount when the valve lift Liftin is held at the minimum value Liftinmin, and at the same time the cam phase Cain is held at the predetermined locking value.

Further, the engine 3 is provided with a control angle sensor 27 in the vicinity of the control shaft 85 (see FIG. 2). The control angle sensor 27 detects a pivot angle of the control shaft 85, and delivers a signal indicative of the sensed control angle to the ECU 2. The ECU 2 calculates the compression ratio Cr based on the signal output from the control angle sensor 27. In the present embodiment, the control angle sensor 27 corresponds to the operating condition parameter-detecting means and the load parameter-detecting means, and the compression ratio Cr corresponds to the operating condition parameter and the load parameter.

Furthermore, as shown in FIG. 2, connected to the ECU 2 are an accelerator pedal opening sensor 28, and an ignition switch (hereinafter referred to as "the IG•SW") 29. The accelerator pedal opening sensor 28 detects a stepped-on amount AP of an accelerator pedal, not shown, of the vehicle (hereinafter referred to as "the accelerator pedal opening AP") and delivers a signal indicative of the sensed accelerator pedal opening AP to the ECU 2. Further, the IG•SW 29 is turned on or off by operation of an ignition key, not shown, and delivers a signal indicative of the ON/OFF state thereof to the ECU 2.

The ECU 2 is implemented by a microcomputer including a CPU, a RAM, a ROM, and an I/O interface (none of which are shown). The ECU 2 determines operating conditions of the engine 3, based on the detection signals delivered from the above-mentioned sensors 20 to 28, the ON/OFF signal from the IG•SW 29, and the like, and executes control processes. More specifically, as will be described in detail hereinafter, the ECU 2 executes the fuel injection control process and the ignition timing control process according to the operating conditions of the engine 3. Furthermore, the ECU 2 controls the valve lift Liftin and the cam phase Cain via the variable valve lift mechanism 50 and the variable cam phase mechanism 70, respectively, and controls the compression ratio Cr via the variable compression ratio mechanism 80.

It should be noted that in the present embodiment, the ECU 2 corresponds to the operating condition parameter, first estimated intake air amount-calculating means, second estimated intake air amount-calculating means, the load parameter-detecting means, fuel amount-determining means, first failure-determining means, second failure-determining means, drive means, intake air amount-calculating means, engine speed-detecting means, maximum intake air amount-calculating means, ignition timing-determining means, and failure-time target engine speed-setting means.

Next, a description will be given of the control system 1 according to the present embodiment. The control system 1 includes a fuel injection controller 100 (see FIG. 11) for carrying out fuel injection control, and an ignition timing controller 120 (see FIG. 16) for carrying out ignition timing control, both of which are implemented by the ECU 2.

Figure 11:
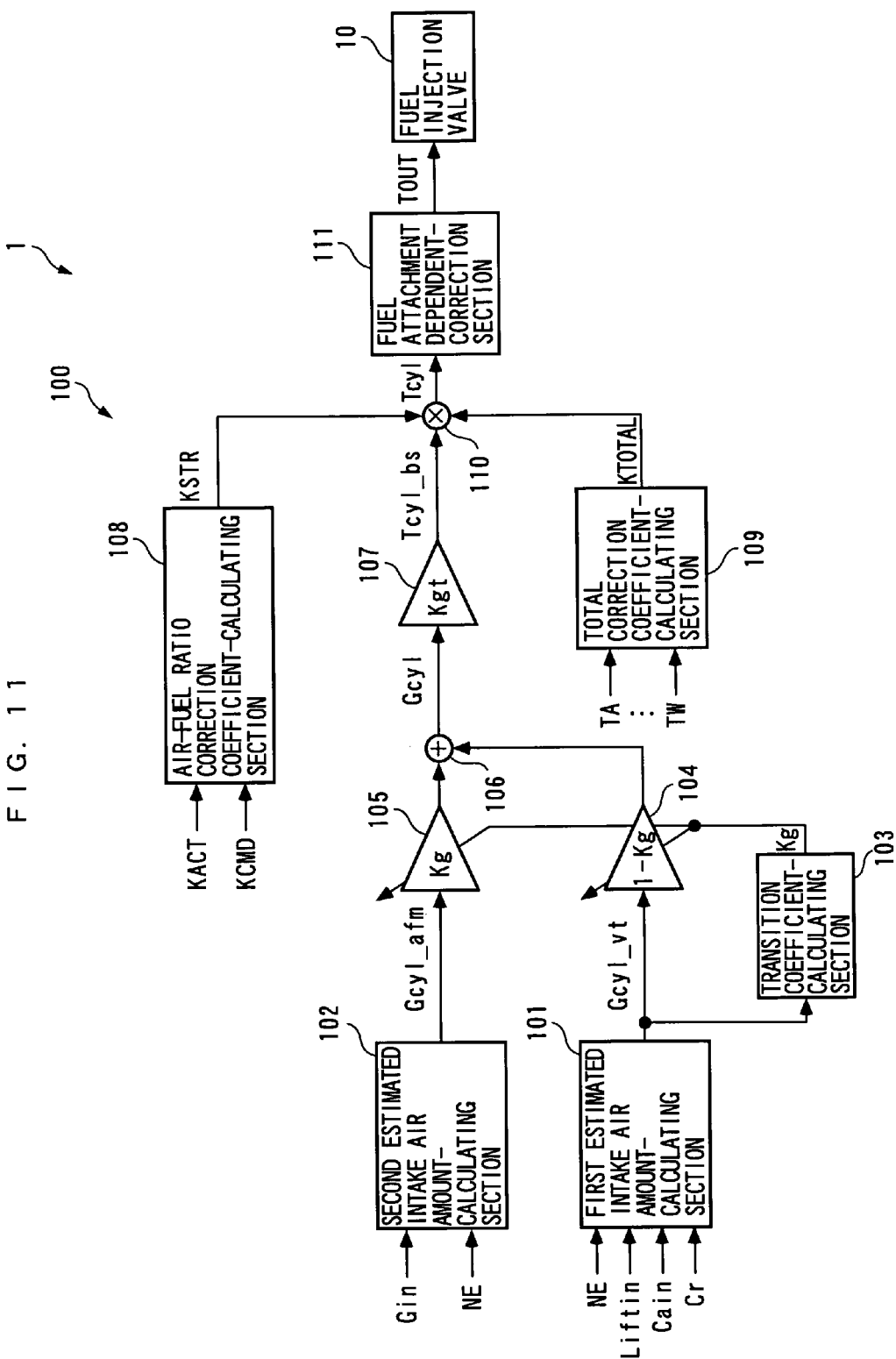
[FIG. 11]

First, a description will be given of the fuel injection controller 100 (fuel amount-determining means). As will be described hereinafter, the fuel injection controller 100 is provided for calculating a fuel injection amount TOUT (fuel amount) for each fuel injection valve 10, and as shown in FIG. 11, includes first and second estimated intake air amount-calculating sections 101 and 102, a transition coefficient-calculating section 103, amplification elements 104 and 105, an addition element 106, an amplification element 107, an air-fuel ratio correction coefficient-calculating section 108, an total correction coefficient-calculating section 109, a multiplication element 110, and a fuel attachment-dependent correction section 111.

The first estimated intake air amount-calculating section 101 (first estimated intake air amount-calculating means) calculates, as described hereinafter, a first estimated intake air amount Gcyl_vt according to the engine speed NE, the valve lift Liftin, the cam phase Cain, and the compression ratio Cr.

Figure 12:
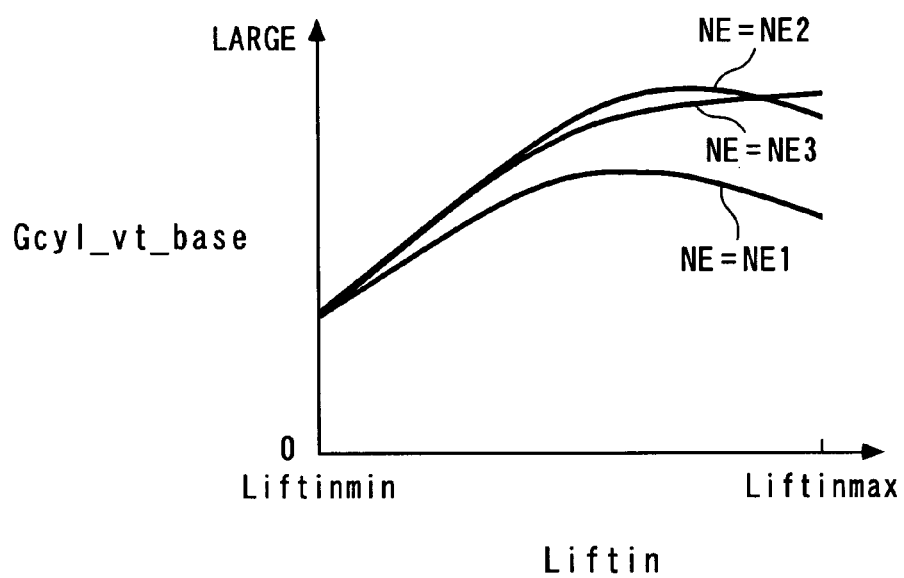
[FIG. 12]

More specifically, first, a basic estimated intake air amount Gcyl_vt_base is calculated by searching a map shown in FIG. 12 according to the engine speed NE and the valve lift Liftin. In FIG. 12, NE 1 to NE3 represent predetermined values of the engine speed NE, between which the relationship of NE1<NE2 <NE3 holds. This also applies to the following description.

In this map, when NE=NE1 or NE2 holds, in a region where the valve lift Liftin is small, the basic estimated intake air amount Gcyl_vt_base is set to a larger value as the valve lift Liftin is larger, whereas in a region where the valve lift Liftin is close to the maximum value Liftinmax, the basic estimated intake air amount Gcyl_vt_base is set to a smaller value as the valve lift Liftin is larger. This is because in a low-to-medium engine speed region, as the valve lift Liftin is larger in the region where the valve lift Liftin is close to the maximum value Liftinmax, the valve-opening time period of the intake valve 4 becomes longer, whereby charging efficiency is reduced by blow-back of intake air. Further, when NE=NE3 holds, the basic estimated intake air amount Gcyl_vt_base is set to a larger value as the valve lift Liftin is larger. This is because in a high engine speed region, the above described blow-back of intake air is made difficult to occur even in a region where the valve lift Liftin is large, due to the inertia force of intake air, so that the charging efficiency becomes higher as the valve lift Liftin is larger.

Figure 13:
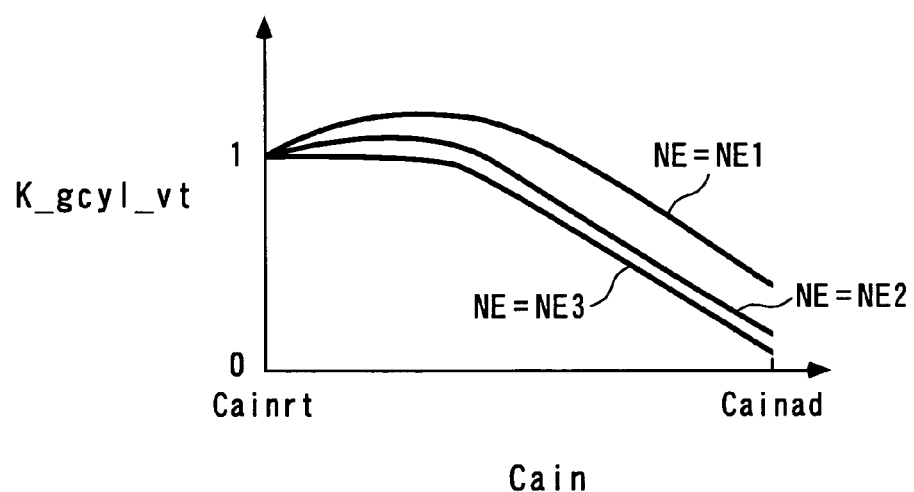
[FIG. 13]

Further, a correction coefficient K_gcyl_vt is calculated by searching a map shown in FIG. 13 according to the engine speed NE and the cam phase Cain. In this map, when NE=NE1 or NE2 holds, in a region where the cam phase Cain is close to the most retarded value Cainrt, the correction coefficient K_gcyl_vt is set to a smaller value as the cam phase Cain is closer to the most retarded value Cainrt, and in the other regions, the correction coefficient K_gcyl_vt is set to a smaller value as the cam phase Cain assumes a value closer to the most advanced value Cainad. This is because in the low-to-medium engine speed region, as the cam phase Cain is closer to the most retarded value Cainrt in the region where the cam phase Cain is close to the most retarded value Cainrt, the valve-closing timing of the intake valve 4 is retarded, whereby the charging efficiency is degraded by the blow-back of intake air, and in the other regions, as the cam phase Cain assumes a value closer to the most advanced value Cainad, the valve overlap is increased to increase the internal EGR amount, whereby the charging efficiency is degraded. Further, when NE=NE3 holds, in the region where the cam phase Cain is close to the most retarded value Cainrt, the correction coefficient K_gcyl_vt is set to a fixed value (a value of 1), and in the other regions, the correction coefficient K_gcyl_vt is set to a smaller value as the cam phase Cain assumes a value closer to the most advanced value Cainad. This is because in the high engine speed region, the blow-back of intake air is made difficult to occur even in a region where the cam phase Cain is close to the most advanced value Cainad, due to the above described inertia force of intake air.

Figure 14:
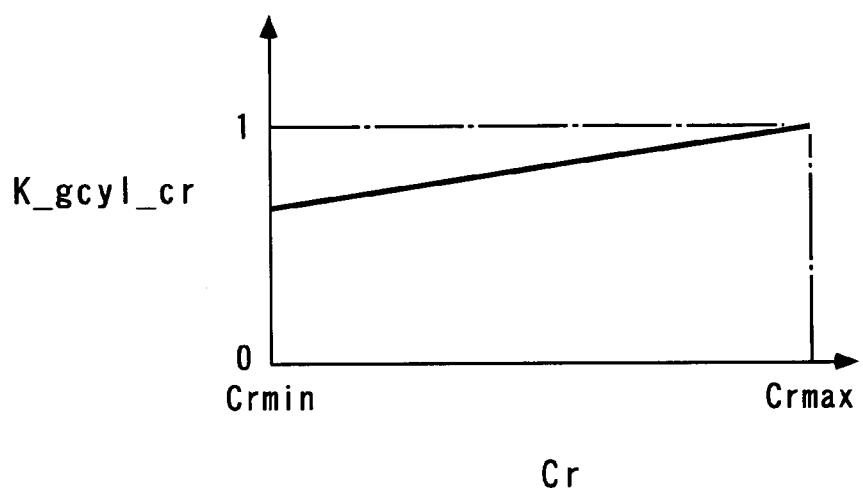
[FIG. 14]

Furthermore, a compression ratio correction coefficient K_gcyl_cr is calculated by searching a table shown in FIG. 14 according to the compression ratio Cr. In this table, the compression ratio correction coefficient K_gcyl_cr is set to a larger value as the compression ratio Cr is higher. This is because in the variable compression ratio mechanism 80, as the compression ratio Cr is higher, the stroke of the piston 3$b$ is increased to increase the displacement of the engine 3.

Then, the first estimated intake air amount Gcyl_vt is calculated using the basic estimated intake air amount Gcyl_vt_base, the correction coefficient K_gcyl_vt, and the compression ratio correction coefficient K_gcyl_cr, calculated as above, by the following equation (1):

$$Gcyl\_vt = K\_gcyl\_vt \cdot K\_gcyl\_cr \cdot Gcyl\_vt\_base \quad (1)$$

Further, the transition coefficient-calculating section 103 calculates a transition coefficient Kg as follows: First, an estimated flow rate Gin_vt (unit: g/sec) is calculated by the following equation (2), using the first estimated intake air amount Gcyl_vt calculated by the first estimated intake air amount-calculating sections 101, and the engine speed NE.

$$Gin\_vt = 2 \cdot Gcyl\_vt \cdot NE/60 \quad (2)$$

Figure 15:
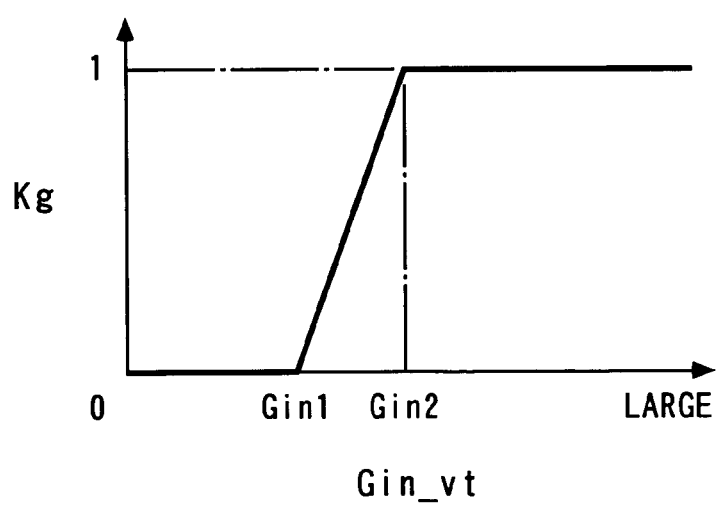
[FIG. 15]

Subsequently, the transition coefficient Kg is calculated by searching a table shown in FIG. 15 according to the estimated flow rate Gin_vt. In FIG. 15, Gin1 and Gin2 represent predetermined values between which the relationship of Gin1<Gin2 holds. Since the flow rate of air flowing through the intake passage 12$a$ is small when the estimated flow rate Gin_vt is within the Gin_vt≦Gin1, the predetermined value Gin1 is set to a value which causes the reliability of the first estimated intake air amount Gcyl_vt to exceed that of a second estimated intake air amount Gcyl_afm, described hereinafter, due to the resolution of the air flow sensor 22. Further, since the flow rate of air flowing through the intake passage 12$a$ is large when the estimated flow rate Gin_vt is within the range of Gin2≦Gin_vt, the predetermined value Gin2 is set to a value which causes the reliability of the second estimated intake air amount Gcyl_afm to exceed that of the first estimated intake air amount Gcyl_vt. Furthermore, in this table, the transition coefficient Kg is set to a value of 0 when the first estimated intake air amount Gcyl_vt is in the range of Gin_vt≦Gin1, and to a value of 1 when the same is within the range of Gin2≦Gin_vt. When the estimated flow rate Gin_vt is within the range of Gin1<Gin_vt<Gin2, the transition coefficient Kg is set to a value which is between 0 and 1, and at the same time proportional to the estimated flow rate Gin_vt. The reason for this will be described hereinafter.

On the other hand, the second estimated intake air amount-calculating section 102 (second estimated intake air amount-calculating means) calculates the second estimated intake air amount Gcyl_afm (unit: g) based on the air flow rate Gin and the engine speed NE, by the following equation (3):

$$Gcyl\_afm = Gin \cdot 60/(2 \cdot NE) \quad (3)$$

The amplification elements 104 and 105 amplifies the first and second estimated intake air amounts Gcyl_vt and Gcyl_afm, calculated as above, to a (1−Kg)-fold and a Kg-fold, respectively. The addition element 106 calculates a calculated intake air amount Gcyl based on the values thus amplified, by a weighted average arithmetic operation expressed by the following equation (4):

$$Gcyl = Kg \cdot Gcyl\_afm + (1-Kg) \cdot Gcyl\_vt \quad (4)$$

As is clear from the equation (4), when Kg=0, i.e. within the aforementioned range of Gin_vt≦Gin1, Gcyl=Gcyl_vt holds, and when Kg=1, i.e. within the aforementioned range of Gin2≦Gin_vt, Gcyl=Gcyl_afm holds. When 0<Kg<1, i.e. when the estimated flow rate Gin_vt is within the range of Gin1<Gin_vt<Gin2, the degrees of weighting the first and second estimated intake air amounts Gcyl_vt and Gcyl_afm in the calculated intake air amount Gcyl are determined by the value of the transition coefficient Kg.

Furthermore, the amplification element 107 calculates a basic fuel injection amount Tcyl_bs based on the calculated intake air amount Gcyl (intake air amount), by the following equation (5):

$$Tcyl\_bs = Kgt \cdot Gcyl \quad (5)$$

wherein Kgt represents a conversion coefficient set in advance for each fuel injection valve 10.

Further, the air-fuel ratio correction coefficient-calculating section 108 calculates an air-fuel ratio correction coefficient KSTR according to the detected air-fuel ratio KACT and a target air-fuel ratio KCMD, with predetermined control algorithms (not shown) including a feedback control algorithm.

Further, the total correction coefficient-calculating section 109 calculates various correction coefficients by searching maps and tables, none of which are shown, according to parameters, such as the engine coolant temperature TW and the intake air temperature TA, indicative of the operating conditions of the engine 3, and calculates a total correction coefficient KTOTAL by multiplying the thus calculated correction coefficients by each other.

The multiplication element 110 calculates a required fuel injection amount Tcyl by the following equation (6):

$$Tcyl = Tcyl\_bs \cdot KSTR \cdot KTOTAL \quad (6)$$

Furthermore, the fuel attachment-dependent correction section 111 calculates the fuel injection amount TOUT by performing a predetermined fuel attachment-dependent correction process on the required fuel injection amount Tcyl calculated as above. Then, the fuel injection valve 10 is controlled such that the fuel injection timing and the valve-opening time period thereof assume values determined based on the fuel injection amount TOUT.

As expressed by the above equations (5) and (6), the fuel injection controller 100 calculates the fuel injection amount TOUT based on the calculated intake air amount Gcyl, and as expressed by the equation (4), when Kg=0, Gcyl=Gcyl_vt holds, and when Kg=1, Gcyl=Gcyl_afm holds. This is because as described hereinabove, within the range of Gin_vt≦Gin1, the reliability of the first estimated intake air amount Gcyl_vt exceeds that of the second estimated intake air amount Gcyl_afm, and hence within the above range, the fuel injection amount TOUT is calculated based on the first estimated intake air amount Gcyl_vt higher in reliability, to thereby ensure an excellent accuracy of calculation. Further, in the range of Gin2≦Gin_vt, the flow rate of air flowing through the intake passage 12a is large, and the reliability of the second estimated intake air amount Gcyl_afm exceeds that of the first estimated intake air amount Gcyl_vt, so that in the above range, the fuel injection amount TOUT is calculated based on the second estimated intake air amount Gcyl_afm higher in reliability, to thereby ensure an excellent accuracy of calculation.

Further, when 0<Kg<1 holds, the degrees of weighting the first and second estimated intake air amounts Gcyl_vt and Gcyl_afm in the calculated intake air amount Gcyl are determined by the value of the transition coefficient Kg. This is to avoid the occurrence of the torque step because when one of Gcyl_vt and Gcyl_afm is directly switched to the other thereof, it is considered that a torque step is caused by a large difference between the values of the first and second estimated intake air amounts Gcyl_vt and Gcyl_afm. In other words, as described hereinbefore, within the range of Gin1<Gin_vt<Gin2 in which the transition coefficient Kg satisfies the relationship of 0<Kg<1, the transition coefficient Kg is set such that it assumes a value proportional to the estimated flow rate Gin_vt, so that when the estimated flow rate Gin_vt is varied between Gin1 and Gin2, the transition coefficient Kg is progressively changed with the variation in the estimated flow rate Gin_vt. This causes the calculated intake air amount Gcyl to progressively change from a value of one of the first and second estimated intake air amounts Gcyl_vt and Gcyl_afm to a value of the other thereof. As a result, it is possible to avoid occurrence of the torque step.

Figure 16:
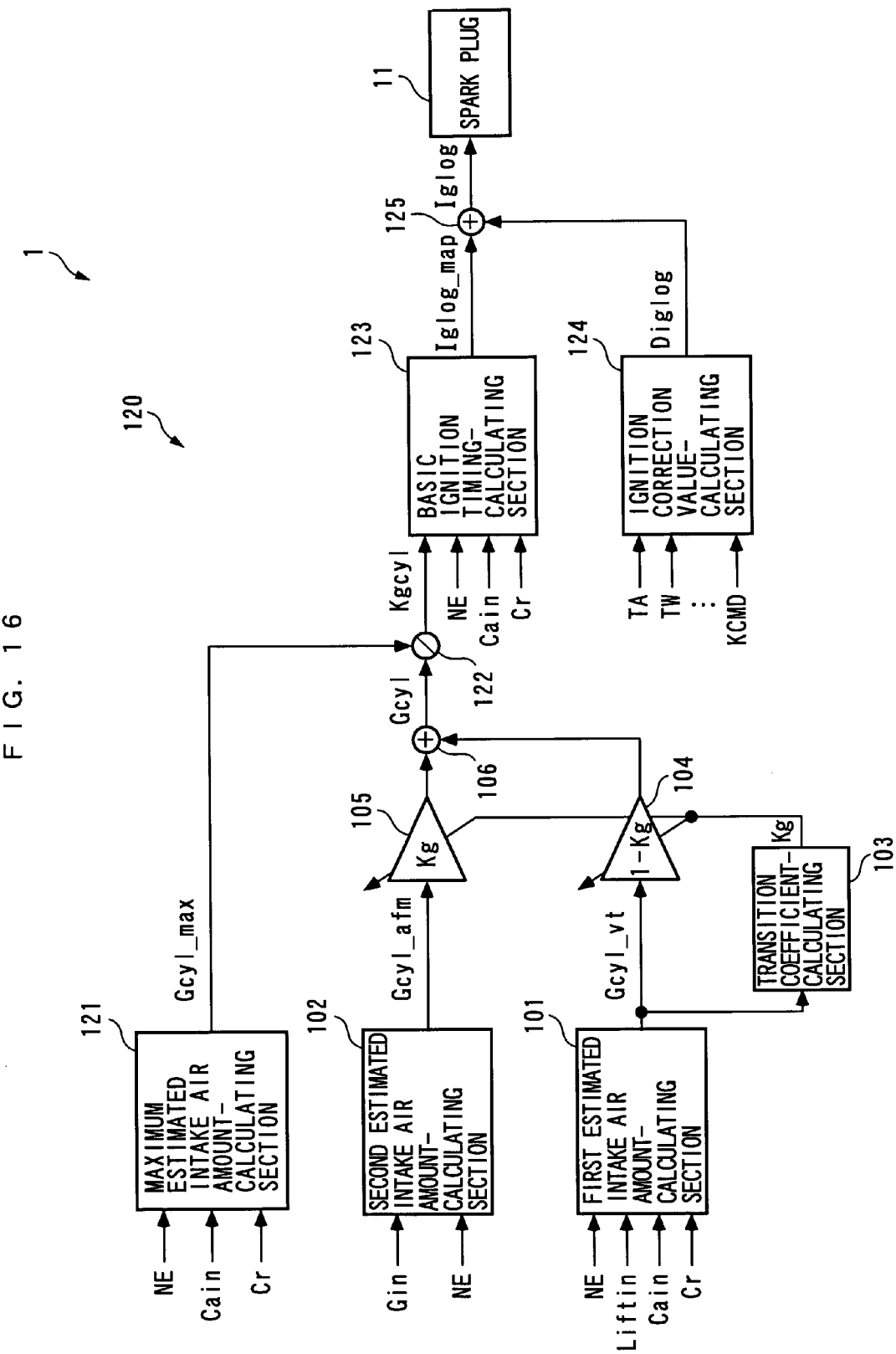
[FIG. 16]

Next, the ignition timing controller 120 (ignition timing-determining means) will be described with reference to FIG. 16. As shown in FIG. 16, in the ignition timing controller 120, part thereof is configured similarly to the fuel injection controller 100 described above, and hence component elements of the ignition timing controller 120 identical to those of the fuel injection controller 100 are designated by identical reference numerals, and detailed description thereof is omitted. As described hereinafter, the ignition timing controller 120 calculates ignition timing Iglog, and is comprised of the first and second estimated intake air amount-calculating sections 101 and 102, the transition coefficient-calculating section 103, the amplification elements 104 and 105, the addition element 106, a maximum estimated intake air amount-calculating section 121, a division element 122, a basic ignition timing-calculating section 123, an ignition correction value-calculating section 124, and an addition element 125.

Figure 17:
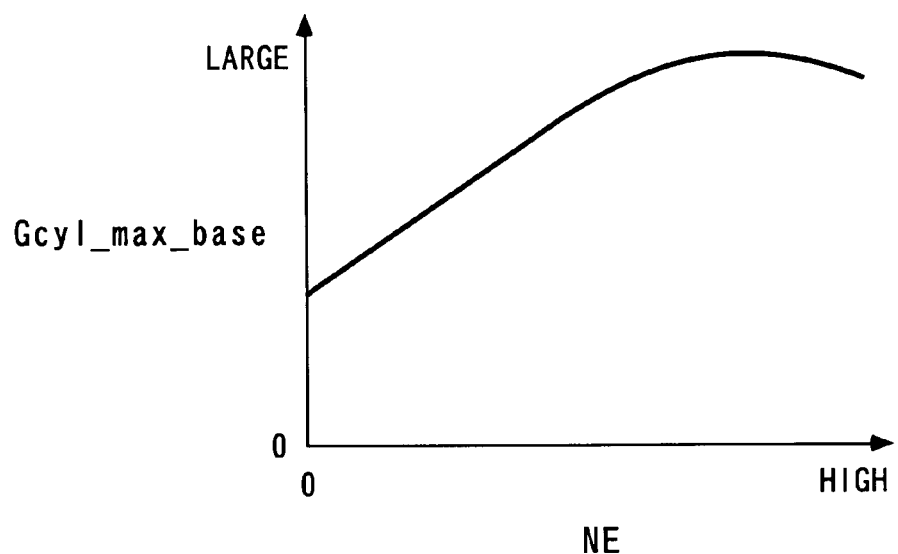
[FIG. 17]

The maximum estimated intake air amount-calculating section 121 (maximum intake air amount-calculating means) calculates, as described hereinafter, a maximum estimated intake air amount Gcyl_max (maximum intake air amount) according to the engine speed NE, the cam phase Cain, and the compression ratio Cr. More specifically, first, a basic value Gcyl_max_base of the maximum estimated intake air amount is calculated by searching a table shown in FIG. 17 according to the engine speed NE. In this table, in the low-to-medium engine speed region, the basic value Gcyl_max_base is set to a larger value as the engine speed NE is higher, and in the high engine speed region, the basic value Gcyl_max_base is set to a smaller value as the engine speed NE is higher. In the medium engine speed region, when the engine speed NE assumes a predetermined value, the basic value Gcyl_max base is set to assume a maximum value. This is because from the viewpoint of drivability, the intake system is configured such that the charging efficiency becomes highest when the engine speed NE assumes the predetermined value in the medium engine speed region.

Figure 18:
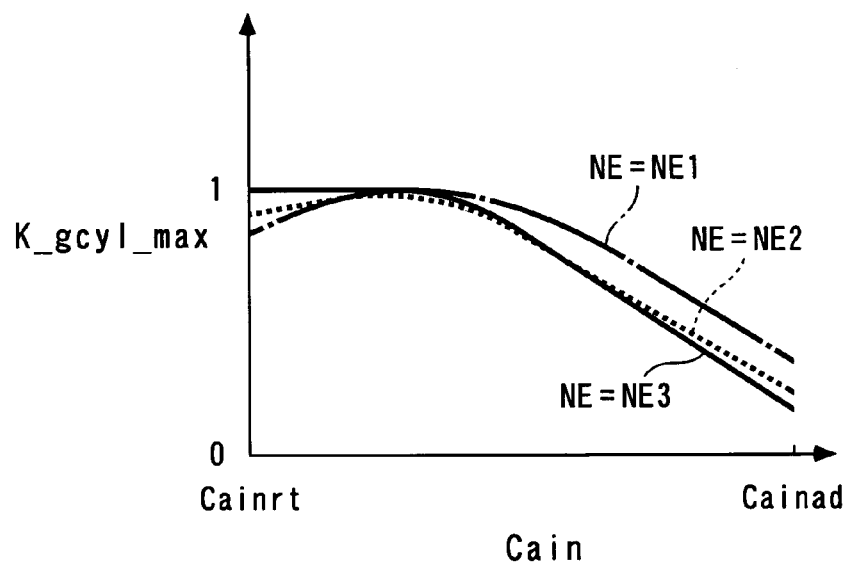
[FIG. 18]

Further, a correction coefficient K_gcyl_max is calculated by searching a map shown in FIG. 18 according to the engine speed NE and the cam phase Cain. In this map, when NE=NE1 or NE2 holds, in a region where the cam phase Cain is close to the most retarded value Cainrt, the correction coefficient K_gcyl_max is set to a smaller value as the cam phase Cain is closer to the most retarded value Cainrt, and in the other regions, the correction coefficient K_gcyl_max is set to a smaller value as the cam phase Cain assumes a value closer to the most advanced value Cainad. Further, when NE=NE3 holds, in the region where the cam phase Cain is close to the most retarded value Cainrt, the correction coefficient K_gcyl_max is set to a fixed value (a value of 1), and in the other regions, the correction coefficient K_gcyl_max is set to a smaller value as the cam phase Cain assumes a value closer to the most advanced value Cainad. The correction coefficient K_gcyl_max is set as above for the same reasons given in the description of the FIG. 13 map used for calculation of the aforementioned correction coefficient K_gcyl_vt.

Further, as described hereinbefore, the compression ratio correction coefficient K_gcyl_cr is calculated by searching the table shown in FIG. 14 according to the compression ratio Cr. Then, the maximum estimated intake air amount Gcyl_max is calculated using the basic value Gcyl_max_base of the maximum estimated intake air amount, the correction coefficient K_gcyl_max, and the compression ratio correction coefficient K_gcyl_cr, determined as above, by the following equation (7):

$$Gcyl\_max = K\_gcyl\_max \cdot K\_gcyl\_cr \cdot Gcyl\_max\_base \quad (7)$$

On the other hand, the division element 122 calculates a normalized intake air amount Kgcyl (ratio) by the following equation (8):

$$Kgcyl = Gcyl/Gcyl\_max \quad (8)$$

Furthermore, the basic ignition timing-calculating section 123 calculates, as described hereinafter, a basic ignition timing Iglog_map by searching a basic ignition timing map according to the normalized intake air amount Kgcyl, the engine speed NE, the cam phase Cain, and the compression ratio Cr. In this case, the basic ignition timing map is comprised of a set of maps for use when Cr=Crmin, and a set of maps for use when Cr=Crmax. The set of maps for use when Cr=Crmin are comprised of a map shown in FIG. 19, for use when Cr=Crmin & Cain=Cainrt, a map shown in FIG. 20, for use when Cr=Crmin & Cain=Cainad, and a plurality of maps (not shown) set in a manner corresponding to values of the cam phase Cain at a plurality of stages, respectively, for use when Cr=Crmin holds, and the cam phase Cain is between the most retarded value Cainrt and the most advanced value Cainad. Further, although not shown, the set of maps for use when Cr=Crmax are also configured similarly to the set of maps for use when Cr=Crmin.

In searching the basic ignition timing maps described above, a plurality of values are selected based on the respective values of the normalized intake air amount Kgcyl, the engine speed NE, the cam phase Cain, and the compression ratio Cr, whereafter the basic ignition timing Iglog_map is calculated by interpolation of the selected values.

As described above, in the basic ignition timing-calculating section 123, the normalized intake air amount Kgcyl is employed as a parameter for setting the map values of the basic ignition timing maps. The reason for this is as follows:

If map values of a basic ignition timing map are set by using the calculated intake air amount Gcyl in place of the normalized intake air amount Kgcyl, as a parameter, as in the prior art, a basic ignition timing map shown in FIG. 21 is obtained, for example. As shown in FIG. 21, in this basic ignition timing map, maximum set values of calculated intake air amounts Gcyl are different from each other, and the set number of map values (number of grid points indicated by black circles) varies with the engine speed NE in regions where the calculated intake air amount Gcyl is large (regions enclosed by ellipses), i.e. in the high-load region of the engine 3 where knocking starts to occur. This is because the charging efficiency of intake air in each cylinder 3a varies according to the engine speed NE, whereby the maximum value of the intake air amount in the high-load region of the engine 3 where knocking starts to occur also varies with the engine speed NE.

Figure 19:
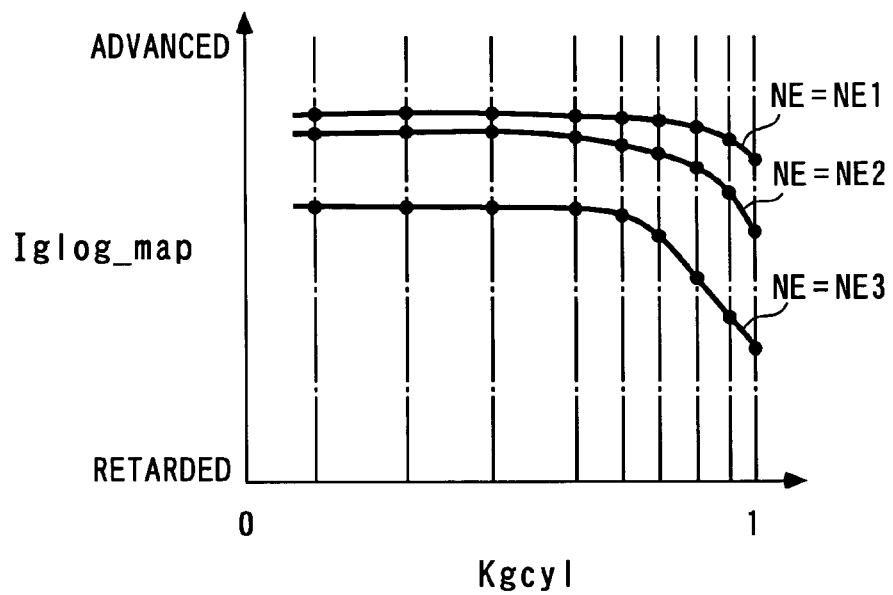
[FIG. 19]
Figure 20:
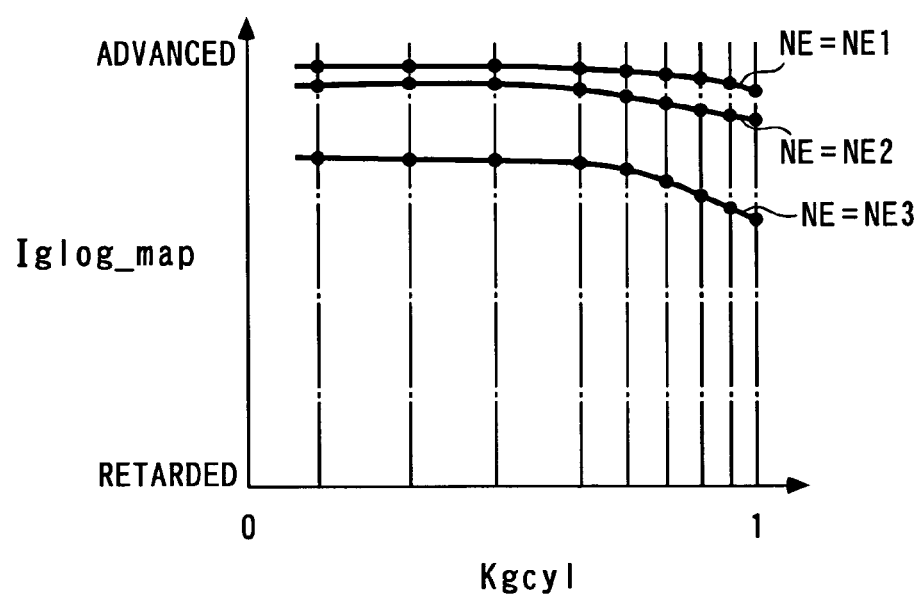
[FIG. 20]

In contrast, in the basic ignition timing map used by the basic ignition timing-calculating section 123, the normalized intake air amount Kgcyl is used as a parameter in place of the calculated intake air amount Gcyl, so that as is clear from FIGS. 19 and 20, even in the high-load region of the engine 3 where knocking starts to occur, that is, even in a region where the normalized intake air amount Kgcyl is equal to 1 or close thereto, the number of map values of the set values NE1 to NE3 of the engine speed can be set to the same number, whereby the number of set data can be made smaller than in the FIG. 21 map. This means that if the normalized intake air amount Kgcyl is used as a parameter in place of the calculated intake air amount Gcyl, the storage capacity of the ROM in the ECU 2 can be reduced, thereby making it possible to reduce the manufacturing costs of the control system 1.

Further, the above described ignition correction value-calculating section 124 calculates various correction values by searching maps and tables, none of which are shown, according to the intake air temperature TA, the engine coolant temperature TW, and the target air-fuel ratio KCMD, and calculates an ignition correction value Diglog based on the calculated correction values.

Furthermore, the addition element 125 calculates the ignition timing Iglog by the following equation (9):

$$Iglog = Iglog\_map + Diglog \quad (9)$$

The spark plug 11 is controlled to cause a spark discharge in spark discharge timing dependent on the ignition timing Iglog.

Figure 22:
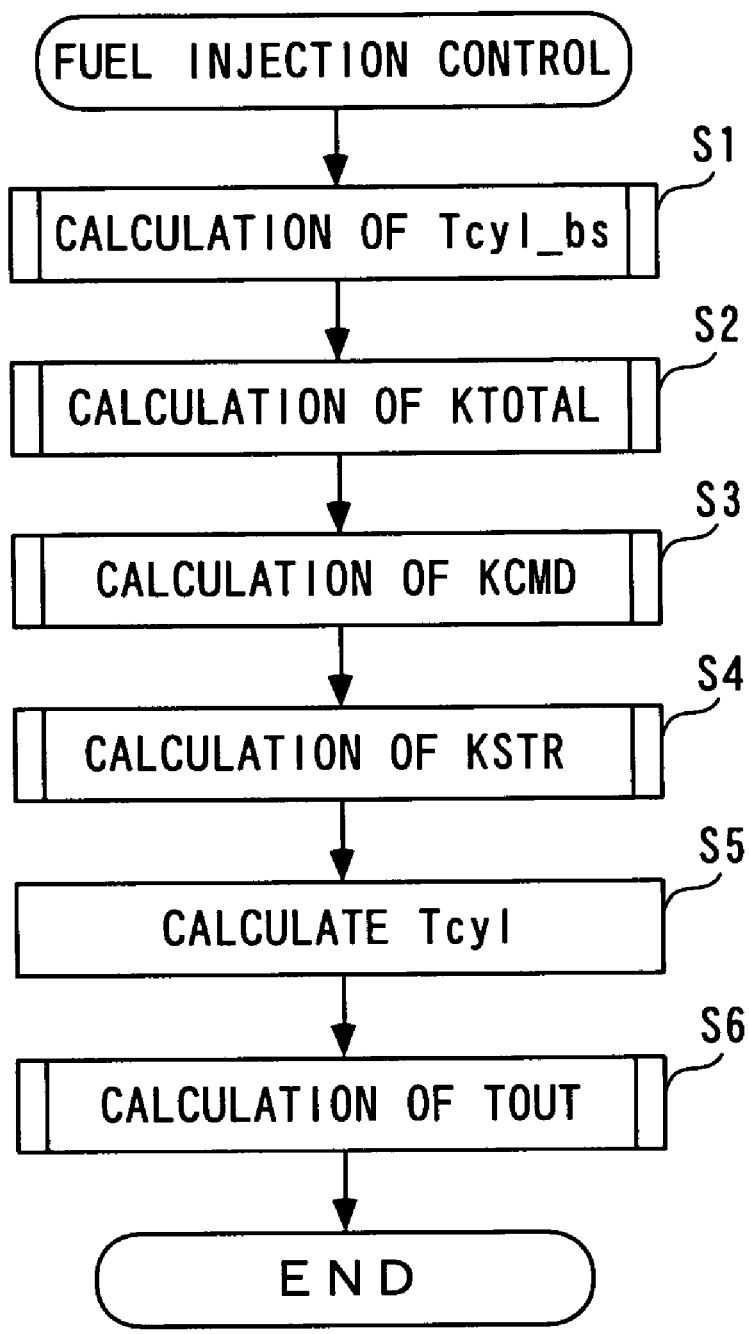
[FIG. 22]

Hereinafter, the fuel injection control process carried out by the ECU 2 will be described with reference to FIG. 22. The present process is for calculating the fuel injection amount TOUT for each fuel injection valve 10, and carried out in timing synchronous with generation of each pulse of the TDC signal.

Figure 23:
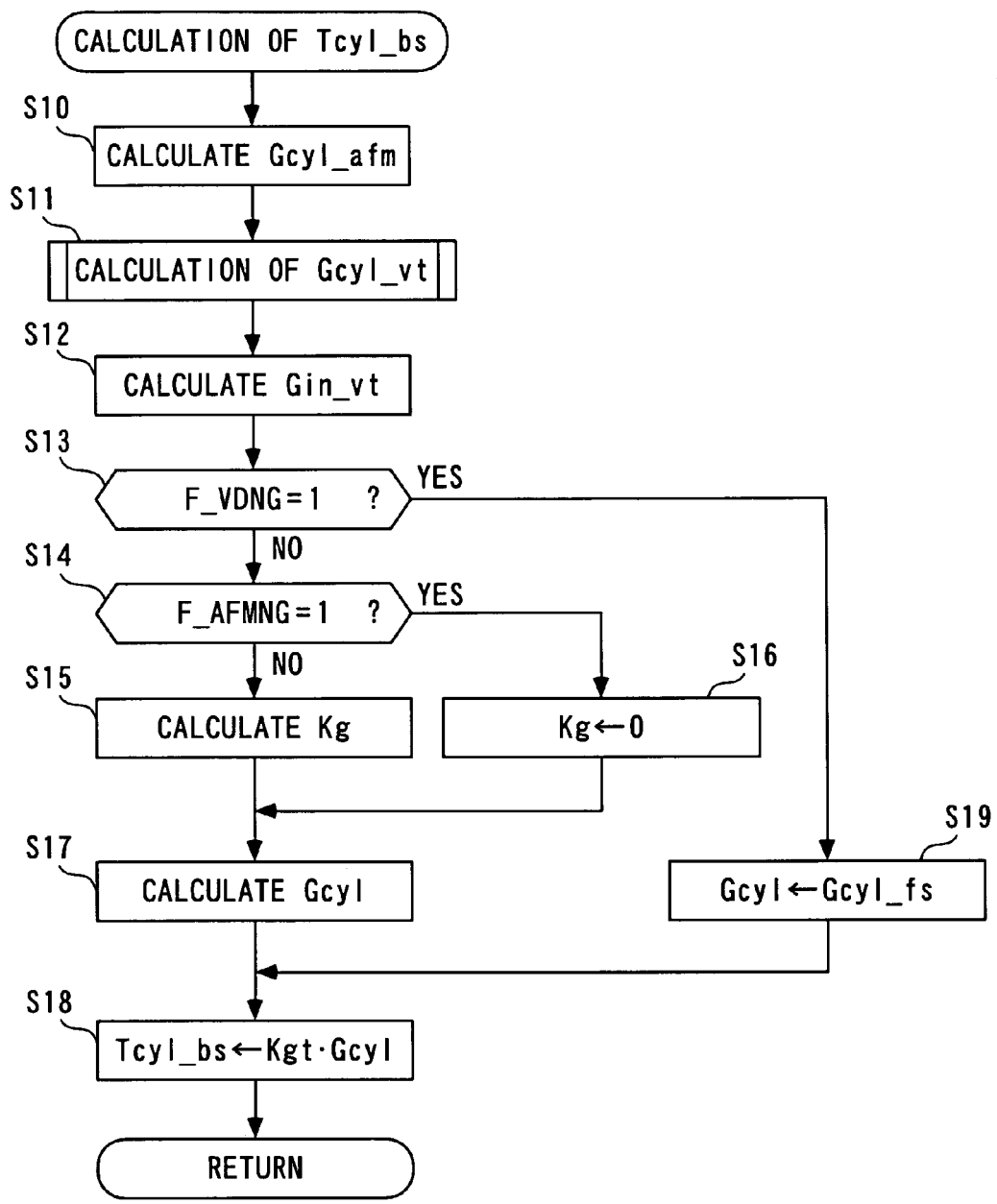
[FIG. 23]

First, in a step 1 (shown as S1 in abbreviated form in FIG. 22; the following steps are also shown in abbreviated form), the basic fuel injection amount Tcyl_bs is calculated. More specifically, the process for calculating the basic fuel injection amount Tcyl_bs is executed as shown in FIG. 23. First, in a step 10, the second estimated intake air amount Gcyl_afm is calculated by the aforementioned equation (3).

Then, in a step 11, the first estimated intake air amount Gcyl_vt is calculated by the method described above. More specifically, the basic estimated intake air amount Gcyl_vt_base is calculated by searching the map shown in FIG. 12 according to the engine speed NE and the valve lift Liftin; the correction coefficient K_gcyl_vt is calculated by searching the map shown in FIG. 13 according to the engine speed NE and the cam phase Cain; and further the compression ratio correction coefficient K_gcyl_cr is calculated by searching the table shown in FIG. 14 according to the compression ratio Cr. Then, the first estimated intake air amount Gcyl_vt is calculated by the aforementioned equation (1) based on the above three values Gcyl_vt_base, K_gcyl_vt, and K_gcyl_cr.

Next, in a step 12, the estimated flow rate Gin_vt is calculated by the aforementioned equation (2). After that, the process proceeds to a step 13, wherein it is determined whether or not a variable mechanism failure flag F_VDNG is equal to 1.

In a failure-determining process, described hereinafter, when it is determined that at least one of the variable valve lift mechanism 50, the variable cam phase mechanism 70, and the variable compression ratio mechanism 80 is faulty, the variable mechanism failure flag F_VDNG is set to 1, whereas when it is determined that the variable valve lift mechanism 50, the variable cam phase mechanism 70, and the variable compression ratio mechanism 80 are all normal, the variable mechanism failure flag F_VDNG is set to 0. It should be noted that in the following description, the variable valve lift mechanism 50, the variable cam phase mechanism 70, and the variable compression ratio mechanism 80 are collectively referred to as "the three variable mechanisms".

If the answer to the question of the step 13 is negative (NO), i.e. if the three variable mechanisms are all normal, the process proceeds to a step 14, wherein it is determined whether or not an air flow sensor failure flag F_AFMNG is equal to 1. In the failure-determining process, described hereinafter, when it is determined that the air flow sensor 22 is faulty, the air flow sensor failure flag F_AFMNG is set to 1, whereas when it is determined that the air flow sensor 22 is normal, the air flow sensor failure flag F_AFMNG is set to 0.

If the answer to the question of the step 14 is negative (NO), i.e. if the air flow sensor 22 is normal, the process proceeds to a step 15, wherein as described hereinabove, the transition coefficient Kg is calculated by searching the table shown in FIG. 15 according to the estimated flow rate Gin_vt.

On the other hand, if the answer to the question of the step 14 is affirmative (YES), i.e. if the air flow sensor 22 is faulty, the process proceeds to a step 16, wherein the transition coefficient Kg is set to a value of 0.

In a step 17 following the step 15 or 16, the calculated intake air amount Gcyl is calculated by the aforementioned equation (4). Then, in a step 18, the basic fuel injection amount Tcyl_bs is set to the product Kgt·Gcyl of the conversion coefficient and the calculated intake air amount, followed by terminating the present process.

On the other hand, if the answer to the question of the step 13 is affirmative (YES), i.e. if it is determined that at least one of the three variable mechanisms is faulty, the process proceeds to a step 19, wherein the calculated intake air amount Gcyl is set to the above described predetermined failure time value Gcyl_fs. Then, the aforementioned step 18 is carried out, followed by terminating the present process.

Referring again to FIG. 22, after the basic fuel injection amount Tcyl_bs is determined in the step 1 as described above, the process proceeds to a step 2, wherein the total correction coefficient KTOTAL is calculated. More specifically, as described hereinabove, the total correction coefficient KTOTAL is calculated by calculating the various correction coefficients by searching the tables and maps according to the operating parameters (e.g. the intake air temperature TA, the atmospheric pressure PA, the engine coolant temperature TW, the accelerator pedal opening AP, and so forth), and then multiplying the thus calculated correction coefficients by each other.

Then, the process proceeds to a step 3, wherein the target air-fuel ratio KCMD is calculated by searching a map, not shown, according to the accelerator pedal opening AP and the calculated intake air amount Gcyl. Basically, the target air-fuel ratio KCMD is set to a stoichiometric air-fuel ratio (14.5) so as to maintain excellent emission-reducing performance of the catalytic converter.

Next, the process proceeds to a step 4, wherein the air-fuel ratio correction coefficient KSTR is calculated according to the target air-fuel ratio KCMD and the detected air-fuel ratio KACT with the predetermined control algorithms including the feedback control algorithm.

Then, the process proceeds to a step 5, wherein the required fuel injection amount Tcyl is calculated by the aforementioned equation (6). After that, in a step 6, as described hereinbefore, the fuel injection amount TOUT is calculated by performing a predetermined fuel attachment-dependent correction process on the required fuel injection amount Tcyl, followed by terminating the present process. Thus, each fuel injection valve 10 is controlled such that the fuel injection timing and the valve-opening time period thereof assume values determined based on the fuel injection amount TOUT.

Figure 24:
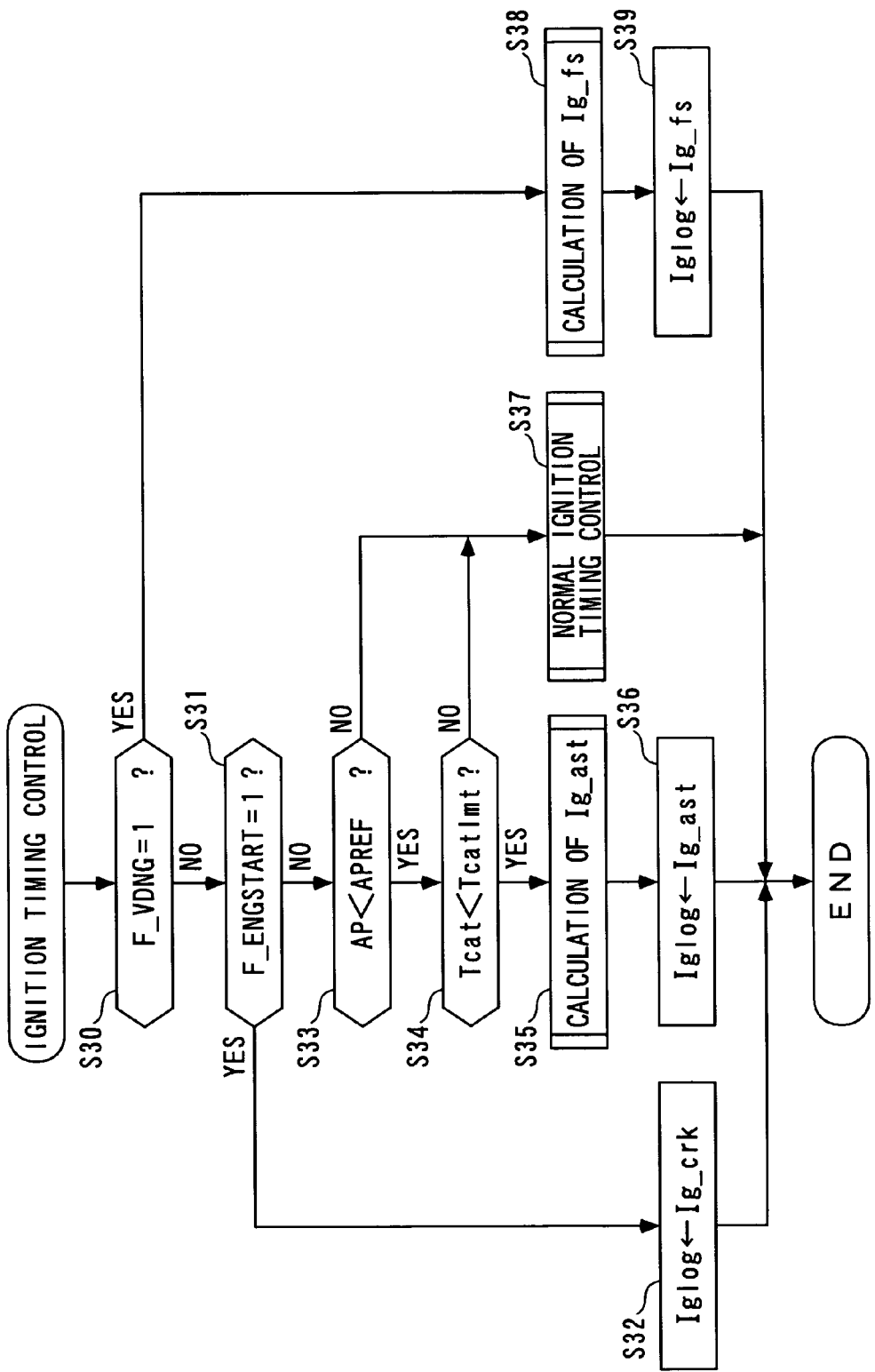
[FIG. 24]

Next, the ignition timing control process carried out by the ECU 2 will be described with reference to FIG. 24. The present process is for calculating the ignition timing Iglog, as described hereinafter, and performed immediately after the above described fuel injection control process in timing synchronous with generation of each pulse of the TDC signal.

In this process, first, it is determined in a step 30 whether or not the aforementioned variable mechanism failure flag F_VDNG is equal to 1. If the answer to this question is negative (NO), i.e. if the three variable mechanisms are all normal, the process proceeds to a step 31, wherein it is determined whether or not an engine start flag F_ENGSTART is equal to 1.

The above engine start flag F_ENGSTART is set by determining in a determination process, not shown, whether or not engine starting control, i.e. cranking is being executed, based on the engine speed NE and a signal output from the IG•SW 29. More specifically, when the engine starting control is being executed, the engine start flag F_ENGSTART is set to 1, and otherwise set to 0.

If the answer to the question of the step 31 is affirmative (YES), i.e. if the engine starting control is being executed, the process proceeds to a step 32, wherein the ignition timing Iglog is set to a predetermined start-time value Ig_crk (e.g. BTDC 10°) for starting of the engine 3, followed by terminating the present process.

On the other hand, if the answer to the question of the step 31 is negative (NO), i.e. if the engine starting control is not being executed, the process proceeds to a step 33, wherein it is determined whether or not the accelerator pedal opening AP is smaller than a predetermined value APREF. The predetermined value APREF is for determining that the accelerator pedal is not stepped on, and set to a value (e.g. 1°) capable of determining that the accelerator pedal is not stepped on.

If the answer to this question is affirmative (YES), i.e. if the accelerator pedal is not stepped on, the process proceeds to a step 34, wherein it is determined whether or not an execution time period Tcat for the catalyst warmup control, which is represented by a time period elapsed immediately after termination of the start of the engine 3, is smaller than a predetermined value Tcatlmt (e.g. 30 sec). The catalyst warmup control is executed for rapidly activating catalyst in the catalytic converter arranged in the exhaust pipe 13 after the start of the engine 3. If the answer to this question is affirmative (YES), i.e. if Tcat<Tcatlmt holds, it is judged that the catalyst warmup control should be executed, and the process proceeds to a step 35, wherein a catalyst warmup value Ig_ast is calculated. More specifically, the catalyst warmup value Ig_ast is calculated with a response-specifying control algorithm (a sliding mode control algorithm or a back-stepping control algorithm) expressed by the following equations (10) to (12).

$$\text{Ig\_ast} = \text{Ig\_ast\_base} - Krch \cdot \sigma(k) - Kadp \cdot \sum_{i=0}^{k} \sigma(i) \tag{10}$$

$$\sigma(k) = Enast(k) + pole \cdot Enast(k-1) \tag{11}$$

$$Enast(k) = NE(k) - \text{NE\_ast} \tag{12}$$

In the above equations (10) to (12), discrete data with a symbol (k) indicates that it is data sampled (or calculated) in synchronism with a predetermined control cycle (cycle of generation of the CRK signal in the present embodiment). The symbol k indicates a position in the sequence of sampling cycles of respective discrete data. For example, the symbol k indicates that discrete data therewith is a value sampled in the current control timing, and a symbol k-1 indicates that discrete data therewith is a value sampled in the immediately preceding control timing. This also applies to the following discrete data. It should be noted that in the following description, the symbol k and the like provided for the discrete data are omitted as deemed appropriate.

In the equation (10), Ig_ast_base represents a predetermined catalyst warmup reference ignition timing (e.g. BTDC 5°), and Krch and Kadp represent predetermined feedback gains. Further, σ represents a switching function defined by the equation (11). In the equation (11), pole represents a response-specifying parameter set to a value which satisfies the relationship of −1<pole<0, and Enast represents a follow-up error calculated by the equation (12). In the equation (12), NE_ast represents a predetermined catalyst warmup target engine speed (e.g. 1800 rpm). With the above described control algorithm, the catalyst warmup value Ig_ast is calculated as a value for causing the engine speed NE to converge to the catalyst warmup target engine speed NE_ast.

Then, the process proceeds to a step 36, wherein the ignition timing Iglog is set to the catalyst warmup value Ig_ast, followed by terminating the present process.

On the other hand, if the answer to the question of the step 33 or the step 34 is negative (NO), i.e. if Tcat≧Tcatlmt holds, or if the accelerator pedal is stepped on, the process proceeds to a step 37, wherein a normal ignition timing control process is carried out.

Figure 25:
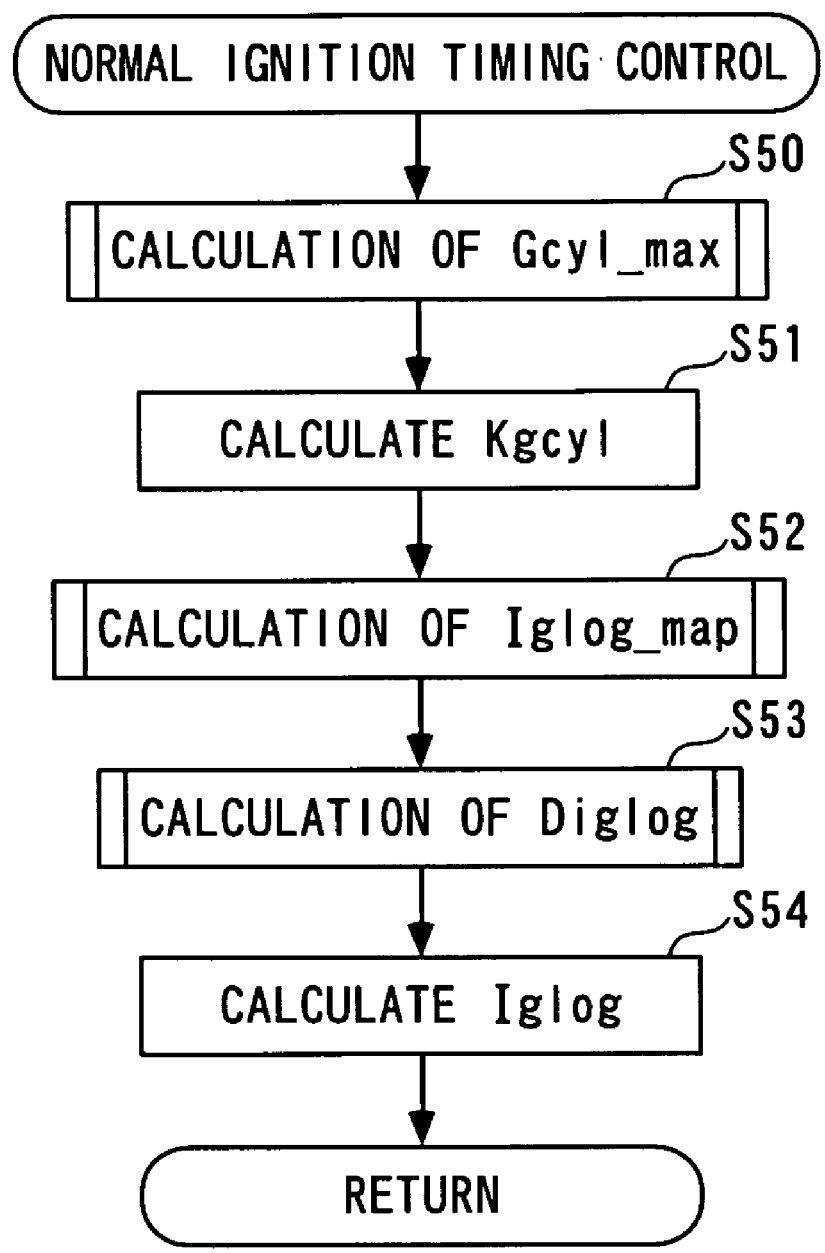
[FIG. 25]

More specifically, the normal ignition timing control process is performed as shown in FIG. 25. First, in a step 50, the maximum estimated intake air amount Gcyl_max is calculated by the above-described method. The basic value Gcyl_max_base of the maximum estimated intake air amount is calculated by searching the table shown in FIG. 17 according to the engine speed NE, and the correction coefficient K_gcyl_max is calculated by searching the map shown in FIG. 18 according to the engine speed NE and the cam phase Cain. Further, the compression ratio correction coefficient K_gcyl_cr is calculated by searching the table shown in FIG. 14 according to the compression ratio Cr. Then, the maximum estimated intake air amount Gcyl_max is calculated by the aforementioned equation (7) based on the above three values Gcyl_max_base, K_gcyl_max, and K_gcyl_cr.

Subsequently, in a step 51, the normalized intake air amount Kgcyl is calculated by the aforementioned equation (8). After that, in a step 52, the basic ignition timing Iglog_map is calculated by the above described method. More specifically, a plurality of values are selected by searching the basic ignition timing map e.g. in FIG. 19 or 20 according to the normalized intake air amount Kgcyl, the engine speed NE, the cam phase Cain, and the compression ratio Cr, and the basic ignition timing Iglog_map is calculated by interpolation of the selected values.

Then, in a step 53, the ignition correction value Diglog is calculated by the above-described method. More specifically, the various correction values are calculated by searching the maps and tables, none of which are shown, according to the intake air temperature TA, the engine coolant temperature TW, the target air-fuel ratio KCMD, and so forth, and the ignition correction value Diglog is calculated based on the calculated correction values. Then, in a step 54, the ignition timing Iglog is calculated by the aforementioned equation (9).

Referring again to FIG. 24, in the step 37, the normal ignition timing control process is carried out as described above, followed by terminating the present process.

On the other hand, if the answer to the question of the step 30 is affirmative (YES), i.e. if at least one of the three variable mechanisms is faulty, the process proceeds to a step 38, wherein a failure time value Ig_fs is calculated. More specifically, the failure time value Ig_fs is calculated with a response-specifying control algorithm (a sliding mode control algorithm or a back-stepping control algorithm) expressed by the following equations (13) to (15).

$$\text{Ig\_fs} = \text{Ig\_fs\_base} - Krch^{\#} \cdot \sigma^{\#}(k) - Kadp^{\#} \cdot \sum_{i=0}^{k} \sigma^{\#}(i) \quad (13)$$

$$\sigma^{\#}(k) = Enfs(k) + pole^{\#} \cdot Enfs(k-1) \quad (14)$$

$$Enfs(k) = NE(k) - \text{NE\_fs} \quad (15)$$

In the above equation (13), Ig_fs_base represents a predetermined reference ignition timing (e.g. TDC±0°) for a failure time, and $Krch^{\#}$ and $Kadp^{\#}$ represent predetermined feedback gains. Further, $\sigma^{\#}$ represents a switching function defined by the equation (14). In the equation (14), $Pole^{\#}$ represents a response-specifying parameter set to a value which satisfies the relationship of $-1 < Pole^{\#} < 0$, and Enfs represents a follow-up error calculated by the equation (15). In the equation (15), NE_fs represents a predetermined failure-time target engine speed (e.g. 2000 rpm). With the above control algorithm, the failure time value Ig_fs is calculated as a value for causing the engine speed NE to converge to the failure-time target engine speed NE_fs.

Then, the process proceeds to a step 39, wherein the ignition timing Iglog is set to the failure time value Ig_fs, followed by terminating the present process.

Figure 26:
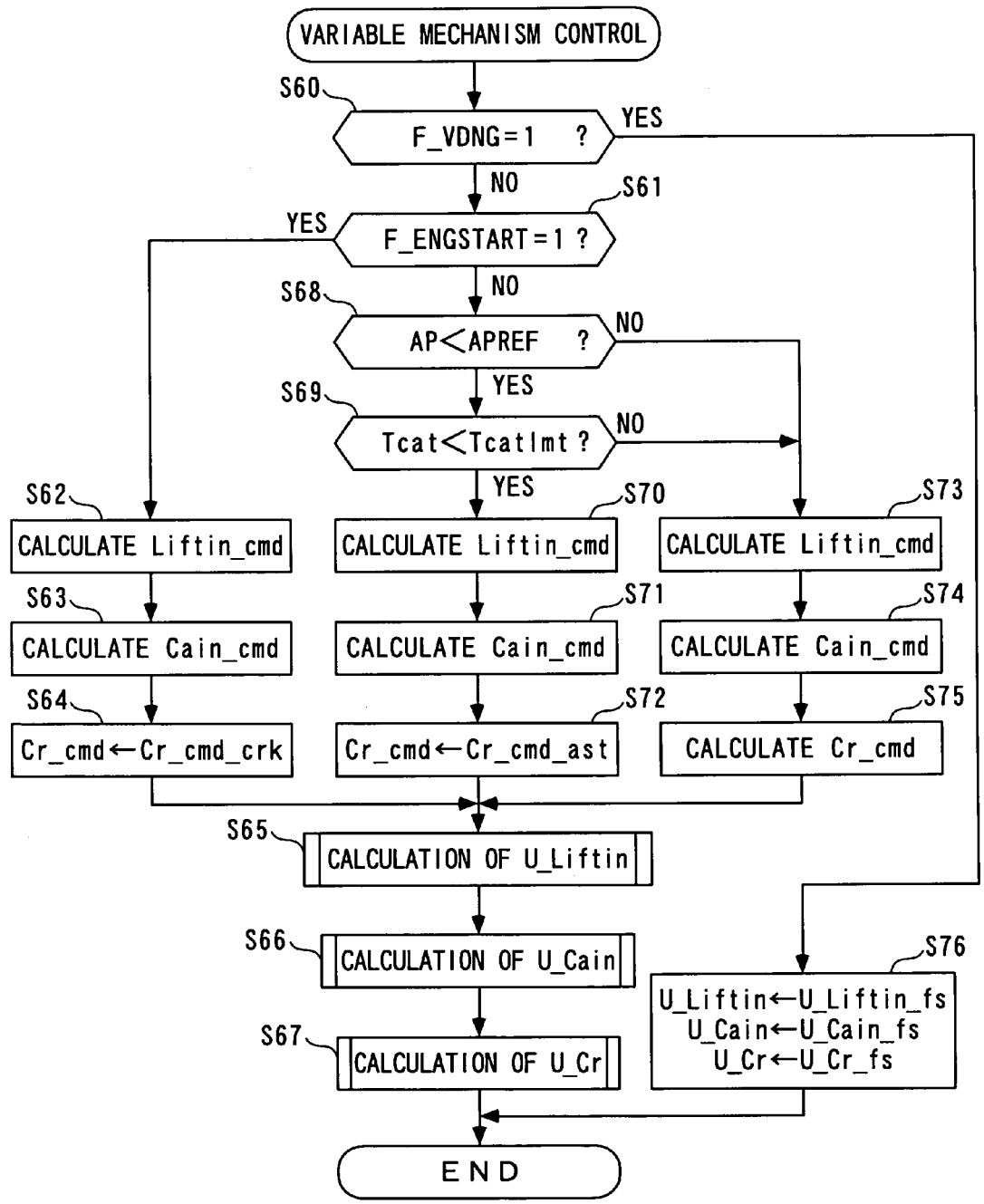
[FIG. 26]

Hereinafter, a variable mechanism control process carried out by the ECU 2 will be described with reference to FIG. 26. The present process is for calculating the three control inputs U_Liftin, U_Cain, and U_Cr for controlling the three variable mechanisms, respectively, and performed at a predetermined control period (e.g. 5 msec.).

In this process, first, it is determined in a step 60 whether or not the aforementioned variable mechanism failure flag F_VDNG is equal to 1. If the answer to this question is negative (NO), i.e. if the three variable mechanisms are all normal, the process proceeds to a step 61, wherein it is determined whether or not the above described engine start flag F_ENGSTART is equal to 1.

Figure 27:
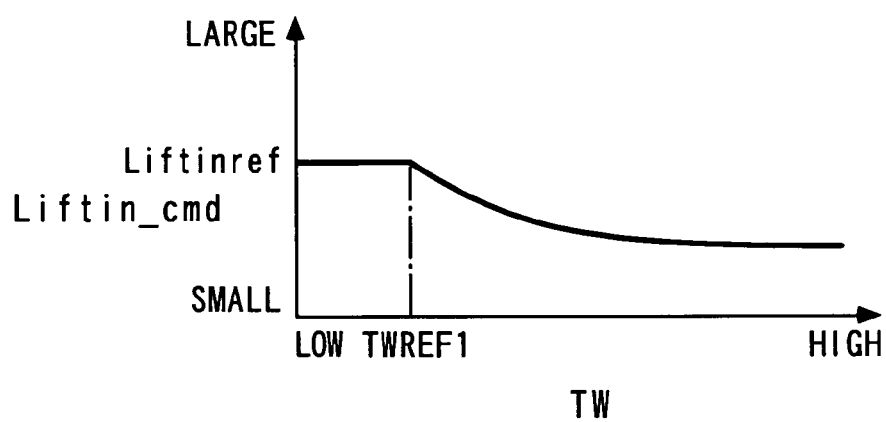
[FIG. 27]

If the answer to the above question is affirmative (YES), i.e. if the engine starting control is being executed, the process proceeds to a step 62, wherein a target valve lift Liftin_cmd is calculated by searching a table shown in FIG. 27 according to the engine coolant temperature TW.

In this table, in a range where the engine coolant temperature TW is higher than a predetermined value TWREF1, the target valve lift Liftin_cmd is set to a larger value as the engine coolant temperature TW is lower, and in a range where TW≦TWREF1 holds, the target valve lift Liftin_cmd is set to a predetermined value Liftinref. This is to compensate for an increase in friction of the variable valve lift mechanism 50, which is caused when the engine coolant temperature TW is low.

Figure 28:
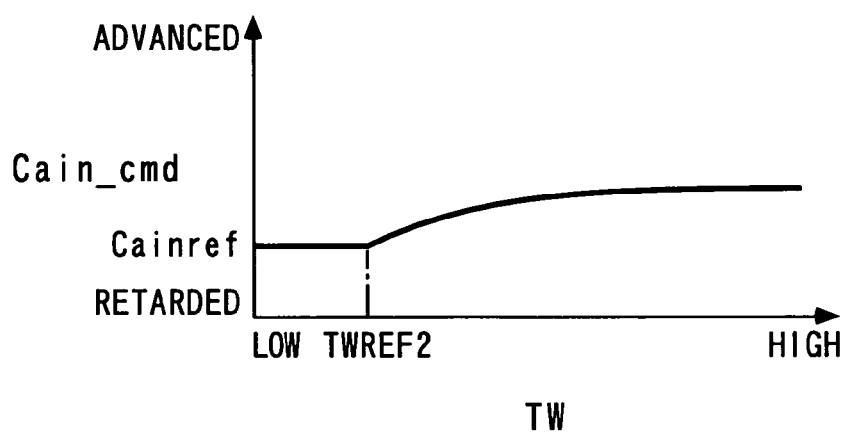
[FIG. 28]

Then, in a step 63, a target cam phase Cain_cmd is calculated by searching a table shown in FIG. 28 according to the engine coolant temperature TW.

In this table, in a range where the engine coolant temperature TW is higher than a predetermined value TWREF2, the target cam phase Cain_cmd is set to a more retarded value as the engine coolant temperature TW is lower, and in a range where TW≦TWREF2 holds, the target cam phase Cain_cmd is set to a predetermined value Cainref. This is to ensure the combustion stability of the engine 3 by controlling the cam phase Cain to a more retarded value when the engine coolant temperature TW is low than when the engine coolant temperature TW is high, to thereby reduce the valve overlap, to increase the flow velocity of intake air.

Then, in a step 64, a target compression ratio Cr_cmd is set to a predetermined start-time value Cr_cmd_crk. The start-time value Cr_cmd_crk is set to a value on a low compression ratio side, which is capable of increasing the engine speed NE during execution of cranking of the engine 3 to suppress generation of unburned HC.

Subsequently, the process proceeds to a step 65, wherein the lift control input U_Liftin is calculated with a target value filter-type two-degree-of-freedom control algorithm expressed by the following equations (16) to (19).

$$U\_Liftin = -Krch\_lf \cdot \sigma\_lf(k) - Kadp\_lf \cdot \sum_{i=0}^{k} \sigma\_lf(i) \quad (16)$$

$$\sigma\_lf(k) = E\_lf(k) + pole\_lf \cdot E\_lf(k-1) \quad (17)$$

$$E\_lf(k) = Liftin(k) - Liftin\_cmd\_f(k) \quad (18)$$

$$Liftin\_cmd\_f(k) = \quad (19)$$
$$-pole\_f\_lf \cdot Liftin\_cmd\_f(k-1) + (1 + pole\_f\_lf)Liftin\_cmd(k)$$

In the equation (16), Krch_lf and Kadp_lf represent a predetermined reaching law gain and a predetermined adaptive law gain, respectively. Furthermore, σ_lf represents a switching function defined by the equation (17). In the equation (17), pole_lf represents a response-specifying parameter set to a value which satisfies the relationship of $-1 < pole\_lf < 0$, and E_lf represents a follow-up error calculated by the equation (18). In the equation (18), Liftin_cmd_f represents a filtered value of the target valve lift, and is calculated with a first-order lag filter algorithm expressed by the equation (19). In the equation (19), pole_f_lf represents a target value filter-setting parameter set to a value which satisfies the relationship of $-1 < pole\_f\_lf < 0$.

Next, the process proceeds to a step 66, wherein the phase control input U_Cain is calculated with a target value filter-type two-degree-of-freedom control algorithm expressed by the following equations (20) to (23).

$$U\_Cain = -Krch\_ca \cdot \sigma\_ca(k) - Kadp\_ca \cdot \sum_{i=0}^{k} \sigma\_ca(i) \quad (20)$$

$$\sigma\_ca(k) = E\_ca(k) + pole\_ca \cdot E\_ca(k-1) \quad (21)$$

$$E\_ca(k) = Cain(k) - Cain\_cmd\_f(k) \quad (22)$$

$$Cain\_cmd\_f(k) = \\ -pole\_f\_ca \cdot Cain\_cmd\_f(k-1) + (1 + pole\_f\_ca)Cain\_cmd(k) \quad (23)$$

In the equation (20), Krch_ca and Kadp_ca represent a predetermined reaching law gain and a predetermined adaptive law gain, respectively. Furthermore, σ_ca represents a switching function defined by the equation (21). In the equation (21), pole_ca represents a response-specifying parameter set to a value which satisfies the relationship of −1<pole_ca<0, and E_ca represents a follow-up error calculated by the equation (22). In the equation (22), Cain_cmd_f represents a filtered value of the target cam phase, and is calculated with a first-order lag filter algorithm expressed by the equation (23). In the equation (23), pole_f_ca represents a target value filter-setting parameter set to a value which satisfies the relationship of −1<pole_f_ca<0.

Then, the process proceeds to a step 67, wherein the compression ratio control input U_Cr is calculated with a target value filter-type two-degree-of-freedom control algorithm expressed by the following equations (24) to (27).

$$U\_Cr = -Krch\_cr \cdot \sigma\_cr(k) - Kadp\_cr \cdot \sum_{i=0}^{k} \sigma\_cr(i) \quad (24)$$

$$\sigma\_cr(k) = E\_cr(k) + pole\_cr \cdot E\_cr(k-1) \quad (25)$$

$$E\_cr(k) = Cr(k) - Cr\_cmd\_f(k) \quad (26)$$

$$Cr\_cmd\_f(k) = \\ -pole\_f\_cr \cdot Cr\_cmd\_f(k-1) + (1 + pole\_f\_cr)Cr\_cmd(k) \quad (27)$$

In the equation (24), Krch_cr and Kadp_cr represent a predetermined reaching law gain and a predetermined adaptive law gain, respectively. Furthermore, σ_cr represents a switching function defined by the equation (25). In the equation (25), pole_cr represents a response-specifying parameter set to a value which satisfies the relationship of −1<pole_cr<0, and E_cr represents a follow-up error calculated by the equation (26). In the equation (26), Cr_cmd_f represents a filtered value of the target compression ratio, and is calculated with a first-order lag filter algorithm expressed by the equation (27). In the equation (27), pole_f_cr represents a target value filter-setting parameter set to a value which satisfies the relationship of −1<pole_f_cr<0.

In the above step 67, the compression ratio control input U_Cr is calculated, followed by terminating the present process.

On the other hand, if the answer to the question of the step 61 is negative (NO), i.e. if the engine starting control is not being executed, the process proceeds to a step 68, wherein it is determined whether or not the accelerator pedal opening AP is smaller than the predetermined value APREF. If the answer to this question is affirmative (YES), i.e. if the accelerator pedal is not stepped on, the process proceeds to a step 69, wherein it is determined whether or not the execution time period Tcat for the catalyst warmup control is smaller than the predetermined value Tcatlmt.

Figure 29:
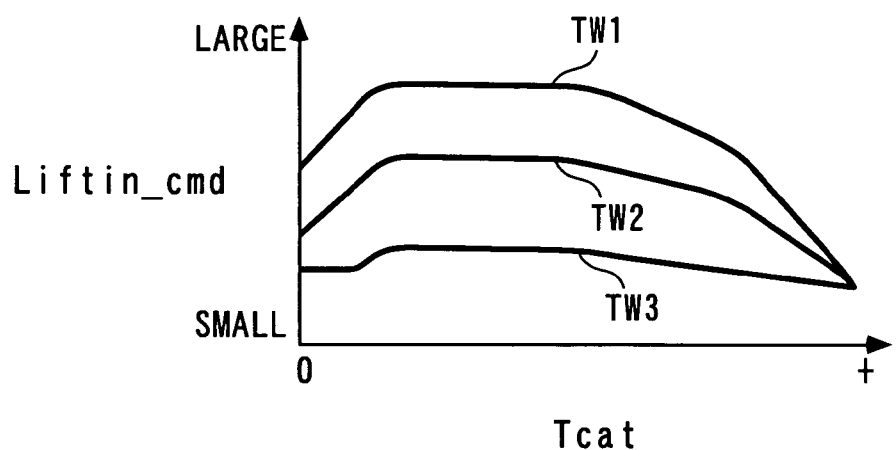
[FIG. 29]

If the answer to this question is affirmative (YES), i.e. if Tcat<Tcatlmt holds, it is judged that the catalyst warmup control should be executed, and the process proceeds to a step 70, wherein the target valve lift Liftin_cmd is calculated by searching a map shown in FIG. 29 according to the execution time period Tcat for the catalyst warmup control and the engine coolant temperature TW. In FIG. 29, TW1 to TW3 indicate predetermined values of the engine coolant temperature TW, between which the relationship of TW1<TW2<TW3 holds. This also applies to the following description.

In this map, the target valve lift Liftin_cmd is set to a larger value as the engine coolant temperature TW is lower. This is because as the engine coolant temperature TW is lower, it takes a longer time period to activate the catalyst, and hence the volume of exhaust gasses is increased to shorten the time period required for activating the catalyst. Furthermore, in the above map, during a time period over which the execution time period Tcat for the catalyst warmup control is short i.e. before reaching a certain time period, the target valve lift Liftin_cmd is set to a larger value as the execution time period Tcat is longer, whereas after the certain time period of the execution time period Tcat has elapsed, the target valve lift Liftin_cmd is set to a smaller value as the execution time period Tcat is longer. This is because the warming up of the engine 3 proceeds along with the lapse of the execution time period Tcat, so that when the friction lowers, unless the intake air amount is decreased, the ignition timing is excessively retarded so as to hold the engine speed NE at a target value, which makes unstable the combustion state of the engine. To avoid the combustion state from being unstable, the map is configured as described above.

Figure 30:
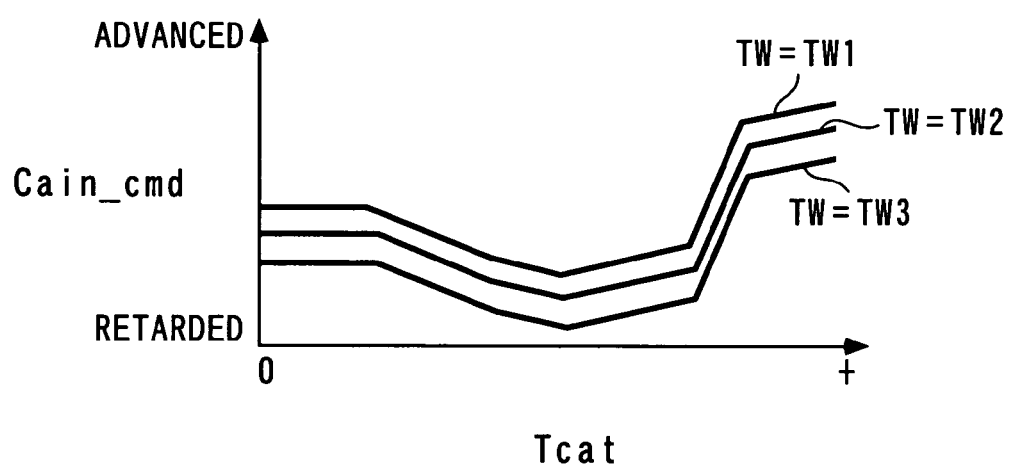
[FIG. 30]

Then, in a step 71, the target cam phase Cain_cmd is calculated by searching a map shown in FIG. 30 according to the execution time period Tcat for the catalyst warmup control and the engine coolant temperature TW.

In this map, the target cam phase Cain_cmd is set to a more advanced value as the engine coolant temperature TW is lower. This is because as the engine coolant temperature TW is lower, it takes a longer time period to activate the catalyst, as described above, and hence the pumping loss is reduced to increase the intake air amount to thereby shorten the time period required for activating the catalyst. Furthermore, in the above map, during a time period over which the execution time period Tcat for the catalyst warmup control is short i.e. before reaching a certain time period, the target cam phase Cain_cmd is set to a more retarded value as the execution time period Tcat is longer, whereas after the certain time period of the execution time period Tcat has elapsed, the target cam phase Cain_cmd is set to a more advanced value as the execution time period Tcat is longer. The reason for this is the same as given in the description of the FIG. 29 map.

Then, in a step 72, the target compression ratio Cr_cmd is set to a predetermined warmup control value Cr_cmd_ast. The warmup control value Cr_cmd_ast is set to a value on a low compression ratio side, which is capable of reducing heat efficiency, and increasing the temperature of exhaust gases so as to shorten the time period required for activating the catalyst.

Following the step 72, the steps 65 to 67 are carried out, as described hereinabove. After that, the present process is terminated.

Figure 31:
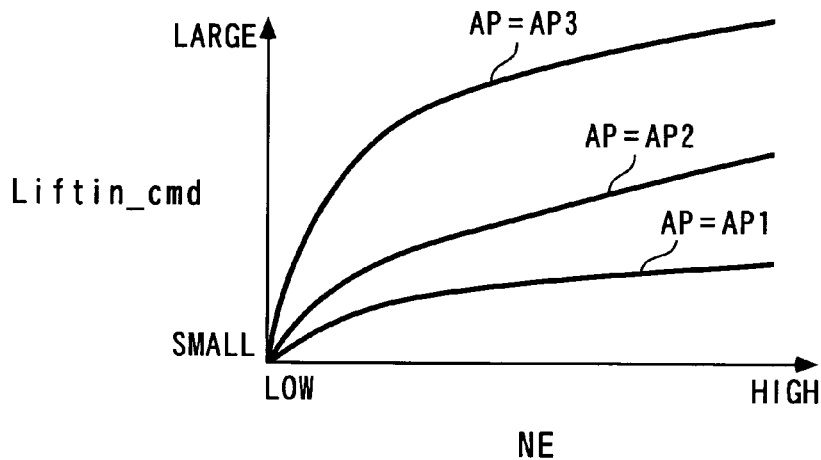
[FIG. 31]

On the other hand, if the answer to the question of the step 68 or the step 69 is negative (NO), i.e. if Tcat≧Tcatlmt holds, or if the accelerator pedal is stepped on, the process proceeds to a step 73, wherein the target valve lift Liftin_cmd is calculated by searching a map shown in FIG. 31 according to the engine speed NE and the accelerator pedal opening AP. In FIG. 31, AP1 to Ap3 indicate predetermined values of the accelerator pedal opening AP, between which the relationship of AP1<AP2<AP3 holds. This also applies to the following description.

In this map, the target valve lift Liftin_cmd is set to a larger value as the engine speed NE is higher, or as the accelerator pedal opening AP is larger. This is because as the engine speed NE is higher, or as the accelerator pedal opening AP is larger, an output required of the engine 3 is larger, and hence a larger intake air amount is required.

Figure 32:
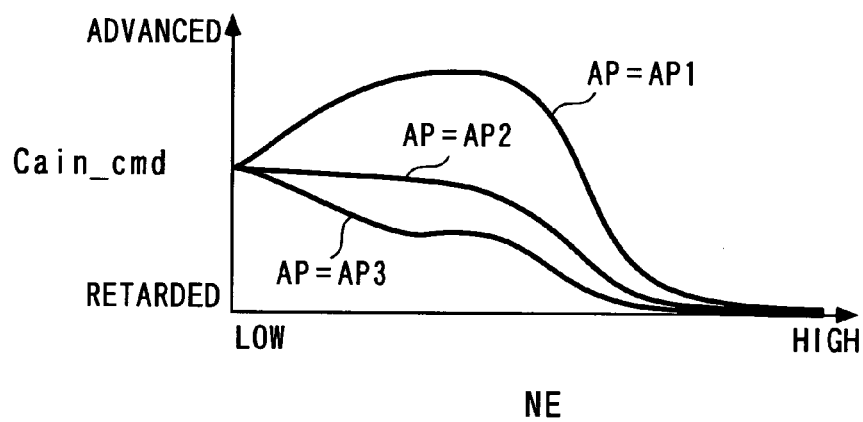
[FIG. 32]

Then, in a step 74, the target cam phase Cain_cmd is calculated by searching a map shown in FIG. 32 according to the engine speed NE and the accelerator pedal opening AP. In this map, when the accelerator pedal opening AP is small, and the engine speed NE is in the medium rotational speed region, the target cam phase Cain_cmd is set to a more advanced value than otherwise. This is because under the above operating conditions of the engine 3, it is necessary to reduce the internal EGR amount to reduce the pumping loss.

Figure 33:
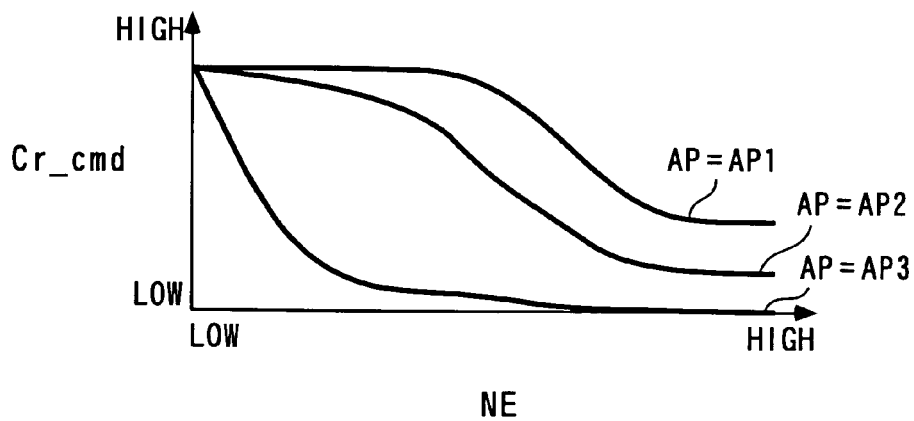
[FIG. 33]

Next, in a step 75, the target compression ratio Cr_cmd is calculated by searching a map shown in FIG. 33 according to the engine speed NE and the accelerator pedal opening AP. In this map, the target compression ratio Cr_cmd is set to a smaller value as the engine speed NE is higher, or as the accelerator pedal opening AP is larger. This is because as the engine 3 is in a higher-load region, in other words, as knocking is more liable to occur, the target compression ratio Cr_cmd is set to a lower compression ratio, whereby the ignition timing is avoided from being excessively retarded to prevent reduction of the combustion efficiency.

Following the step 75, the steps 65 to 67 are carried out, as described hereinabove. After that, the present process is terminated.

On the other hand, if the answer to the question of the step 60 is affirmative (YES), i.e. if at least one of the three variable mechanisms is faulty, the process proceeds to a step 76, wherein the lift control input U_Liftin is set to the predetermined failure time value U_Liftin_fs; the phase control input U_Cain to the predetermined failure time value U_Cain_fs; and the compression ratio control input U_Cr to the predetermined failure time value U_Cr_fs; followed by terminating the present process. As a result, as described above, the valve lift Liftin is held at the minimum value Liftinmin; the cam phase Cain at the predetermined locking value; and the compression ratio Cr at the minimum value Crmin; whereby it is possible to suitably carry out idling or starting of the engine 3 during stoppage of the vehicle, and at the same time hold the vehicle in the state of low-speed traveling when the vehicle is traveling.

Figure 34:
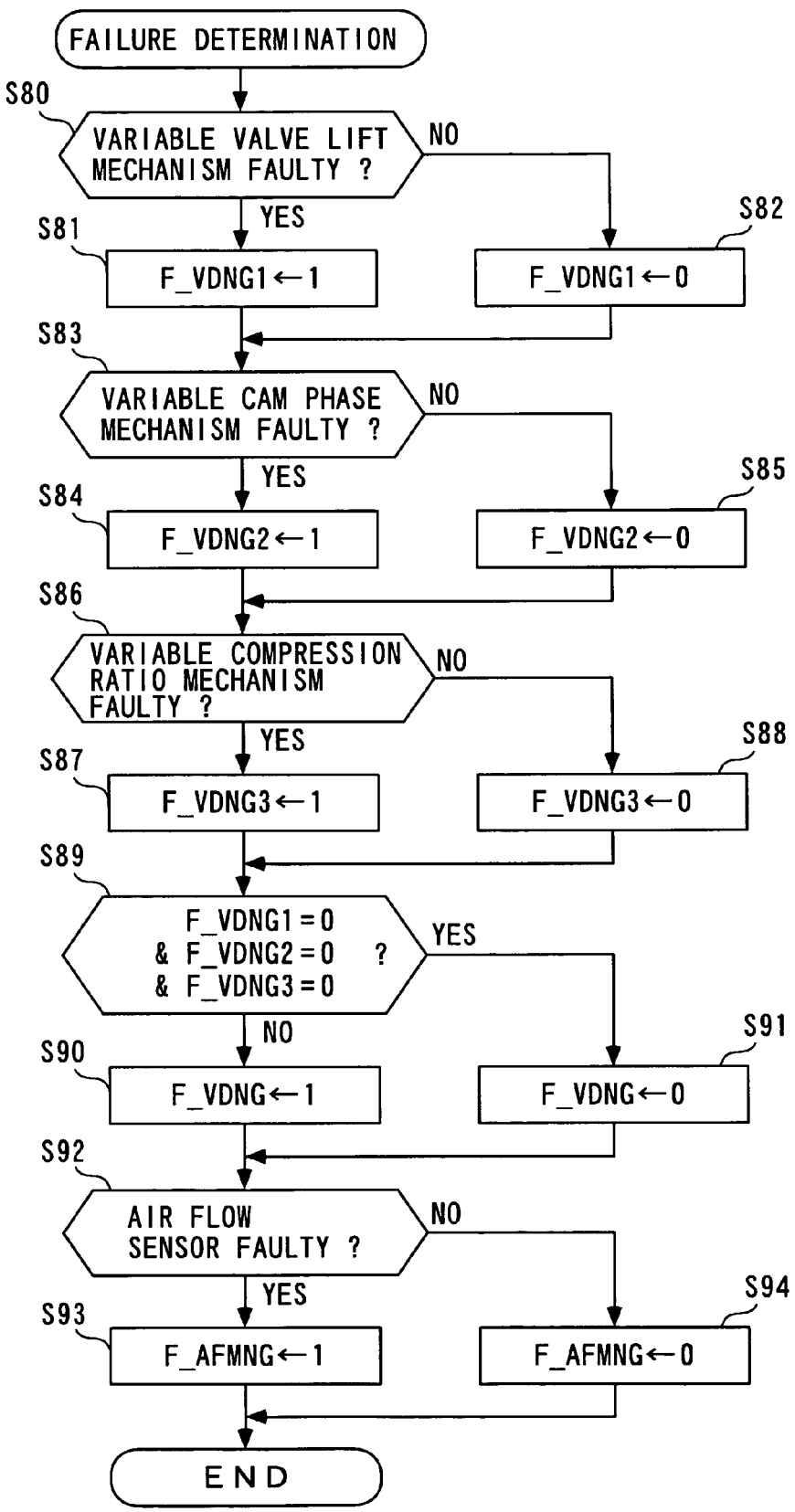
[FIG. 34]

Next, the failure-determining process carried out by the ECU 2, for determining failure of the three variable mechanisms and the air flow sensor 22 will be described with reference to FIG. 34. The present process is for determining whether or not any of the three variable mechanisms and the air flow sensor 22 is faulty, and performed at a predetermined control period (e.g. 5 msec.).

In this process, first, it is determined in a step 80 whether or not the variable valve lift mechanism 50 is faulty. More specifically, when a state in which the absolute value of the difference between the valve lift Liftin and the target valve lift Liftin_cmd exceeds a predetermined threshold value has continued for a predetermined time period or longer, or when a state in which the absolute value of the lift control input U_Liftin exceeds a predetermined value has continued for a predetermined time period or longer, it is determined that the variable valve lift mechanism 50 is faulty, and otherwise it is determined that the variable valve lift mechanism 50 is normal.

If the answer to this question is affirmative (YES), i.e. if the variable valve lift mechanism 50 is faulty, to indicate the fact, the process proceeds to a step 81, wherein a lift mechanism failure flag F_VDNG1 is set to 1. On the other hand, if the answer to the question of the step 80 is negative (NO), i.e. if the variable valve lift mechanism 50 is normal, to indicate the fact, the process proceeds to a step 82, wherein the lift mechanism failure flag F_VDNG1 is set to 0.

In a step 83 following the step 81 or 82, it is determined whether or not the variable cam phase mechanism 70 is faulty. More specifically, when a state in which the absolute value of the difference between the cam phase Cain and the target cam phase Cain Cain_cmd exceeds a predetermined threshold value has continued for a predetermined time period or longer, or when a state in which the absolute value of the phase control input U_Cain exceeds a predetermined value has continued for a predetermined time period or longer, it is determined that the variable cam phase mechanism 70 is faulty, and otherwise it is determined that the variable cam phase mechanism 70 is normal.

If the answer to this question is affirmative (YES), i.e. if the variable cam phase mechanism 70 is faulty, to indicate the fact, the process proceeds to a step 84, wherein a phase mechanism failure flag F_VDNG2 is set to 1. On the other hand, if the answer to the question of the step 83 is negative (NO), i.e. if the variable cam phase mechanism 70 is normal, to indicate the fact, the process proceeds to a step 85, wherein the phase mechanism failure flag F_VDNG2 is set to 0.

In a step 86 following the step 84 or 85, it is determined whether or not the variable compression ratio mechanism 80 is faulty. More specifically, when a state in which the absolute value of the difference between the compression ratio Cr and the target compression ratio Cr_cmd exceeds a predetermined threshold value has continued for a predetermined time period or longer, or when a state in which the absolute value of the compression ratio control input U_Cr exceeds a predetermined value has continued for a predetermined time period or longer, it is determined that the variable compression ratio mechanism 80 is faulty, and otherwise it is determined that the variable compression ratio mechanism 80 is normal.

If the answer to this question is affirmative (YES), i.e. if the variable compression ratio mechanism 80 is faulty, to indicate the fact, the process proceeds to a step 87, wherein a compression ratio mechanism failure flag F_VDNG3 is set to 1. On the other hand, if the answer to the question of the step 86 is negative (NO), i.e. if the variable compression ratio mechanism 80 is normal, to indicate the fact, the process proceeds to a step 88, wherein the compression ratio mechanism failure flag F_VDNG3 is set to 0.

In a step 89 following the step 87 or 88, it is determined whether the above three failure flags F_VDNG1 to F_VDNG3 are all equal to 0. If the answer to this question is negative (NO), i.e. if at least one of the three variable mechanisms is faulty, to indicate the fact, the process proceeds to a step 90, wherein the variable mechanism failure flag F_VDNG is set to 1.

On the other hand, if the answer to the question of the step 89 is negative (NO), i.e. if the three variable mechanisms are all normal, to indicate the fact, the process proceeds to a step 91, wherein the variable mechanism failure flag F_VDNG is set to 0.

In a step 92 following the step 90 or 91, it is determined whether the air flow sensor 22 is faulty. More specifically, a failure determination table, in which a higher limit value and a lower limit value of the second estimated intake air amount Gcyl_afm with respect to the first estimated intake air amount Gcyl_vt, obtained when the air flow sensor 22 is normal are set in advance, is searched according to the first estimated intake air amount Gcyl_vt. When the second estimated intake air amount Gcyl_afm is deviated from a range defined by retrieved values of the higher limit value and the lower limit value, it is determined that the air flow sensor 22 is faulty, whereas when the second estimated intake air amount Gcyl_afm is within the range, it is determined that the air flow sensor 22 is normal.

If the answer to the question to the step 92 is affirmative (YES), i.e. if the air flow sensor 22 is faulty, to indicate the fact, the process proceeds to a step 93, wherein the air flow sensor failure flag F_AFMNG is set to 1, followed by terminating the present process.

On the other hand, if the answer to the question of the step 92 is negative (NO), i.e. if the air flow sensor 22 is normal, to indicate the fact, the process proceeds to a step 94, wherein the air flow sensor failure flag F_AFMNG is set to 0, followed by terminating the present process.

As described above, according to the control system 1 of the present embodiment, the first estimated intake air amount Gcyl_vt is calculated according to the valve lift Liftin, the cam phase Cain, and the compression ratio Cr, and the second estimated intake air amount Gcyl_afm is calculated according to the air flow rate Gin detected by the air flow sensor 22. Then, the calculated intake air amount Gcyl is calculated by the equation (4) as a weighted average value of the first and second estimated intake air amounts Gcyl_vt and Gcyl_afm, and within the range of Gin_vt≦Gin1, Gcyl=Gcyl_vt holds, while within the range of Gin2≦Gin_vt, Gcyl=Gcyl_afm holds.

In the fuel injection control process, the fuel injection amount TOUT is calculated based on the calculated intake air amount Gcyl, and hence when Gin_vt≦Gin1 holds, that is, when the reliability of the detection signal from the air flow sensor 22 is low due to a low flow rate of air flowing through the intake passage 12a, so that the reliability of the first estimated intake air amount Gcyl_vt exceeds that of the second estimated intake air amount Gcyl_afm, the fuel injection amount TOUT can be accurately calculated based on the first estimated intake air amount Gcyl_vt higher in reliability. Further, when Gin2≦Gin_vt holds, that is, when the reliability of the detection signal from the air flow sensor 22 is high due to a high flow rate of air flowing through the intake passage 12a, so that the reliability of the second estimated intake air amount Gcyl_afm exceeds that of the first estimated intake air amount Gcyl_vt, the fuel injection amount TOUT can be accurately calculated based on the second estimated intake air amount Gcyl_afm higher in reliability. As described above, the fuel injection amount TOUT can be calculated with accuracy not only in the low-load region of the engine 3 where the reliability of the first estimated intake air amount Gcyl_vt exceeds that of the second estimated intake air amount Gcyl_afm, but also in a load region opposite thereto, so that it is possible to enhance the accuracy of the fuel injection control, i.e. the accuracy of the air-fuel ratio control. As a result, it is possible to improve fuel economy and reduce exhaust emissions.

Furthermore, the degrees of weighting the first and second estimated intake air amounts Gcyl_vt and Gcyl_afm in the calculated intake air amount Gcyl are determined by the value of the transition coefficient Kg, and when Gin1<Gin_vt<Gin2 holds, the transition coefficient Kg is set such that it assumes a value proportional to the estimated flow rate Gin_vt, so that when the estimated flow rate Gin_vt varies between Gin1 and Gin2, the transition coefficient Kg is progressively changed with the variation in the estimated flow rate Gin_vt. This causes the calculated intake air amount Gcyl to progressively change from a value of one of Gcyl_vt and Gcyl_afm to a value of the other thereof. As a result, even in cases where if one of the first and second estimated intake air amounts Gcyl_vt and Gcyl_afm were directly switched to the other, a torque step would be caused by a change in the fuel injection amount TOUT due to a large difference between the first and second estimated intake air amounts Gcyl_vt and Gcyl_afm, it is possible to avoid occurrence of such a torque step.

Further, when it is determined that the air flow sensor 22 is faulty, Gcyl=Gcyl_vt holds, so that the fuel injection amount TOUT is calculated according to the first estimated intake air amount Gcyl_vt in all the load regions. As a result, even when the reliability of the second estimated intake air amount Gcyl_afm is low due to the failure of the air flow sensor 22, the fuel injection amount TOUT can be properly calculated according to the first estimated intake air amount Gcyl_vt, thereby making it possible to ensure excellent accuracy of the fuel injection control.

Furthermore, when it is determined that at least one of the three variable mechanisms is faulty, all the control inputs U_Liftin, U_Cain, and U_Cr to the three variable mechanisms are set to the predetermined failure time values U_Liftin_fs, U_Cain_fs, and U_Cr_fs, respectively, so as to make the intake air amount equal to the predetermined failure time value Gcyl_fs. Besides, even when the control inputs U_Liftin, U_Cain, and U_Cr are not inputted to the respective three variable mechanisms e.g. due to a disconnection, the valve lift Liftin, the cam phase Cain, and the compression ratio Cr are held by the lock mechanism at respective values which make the intake air amount equal to the predetermined failure time value Gcyl_fs. This makes it possible to avoid an increase in the power output of the engine 3 due to an increase in the intake air amount to thereby avoid acceleration of the engine 3 caused by the increase in the output thereof, and at the same time continue driving of the vehicle while avoiding deceleration of the engine 3 caused by a decrease in the engine speed NE. As a result, it is possible to ensure minimum required running performance of the vehicle.

On the other hand, in the ignition timing control, the basic ignition timing Iglog_map is calculated using the ignition timing maps set in association with the normalized intake air amount Kgcyl and the engine speed NE. Since the normalized intake air amount Kgcyl is calculated as a ratio between the calculated intake air amount Gcyl and the maximum estimated intake air amount Gcyl_max, the normalized intake air amount Kgcyl assumes a value within the range of 0 to 1, and in the high-load region of the engine 3 where the calculated intake air amount Gcyl is close to the maximum estimated intake air amount Gcyl_max and knocking is liable to occur, the normalized intake air amount Kgcyl becomes equal to 1 or a value in the vicinity thereof. Further, data of the basic ignition timing Iglog_map can be set in the ignition timing maps in association with the set values NE1 to NE3 of the engine speed, different from each other, such that the number thereof is equal between the set values NE1 to NE3 with respect to the normalized intake air amount Kgcyl. This makes it possible to reduce the total number of data in the ignition timing maps, compared with the prior art in which data in the ignition timing maps are set in association with the engine speed NE and the intake air amount, and accordingly reduce the storage capacity of a storage medium, such as the ROM, to thereby reduce the manufacturing costs of the control system 1.

Further, as described hereinbefore, the ignition timing Iglog is calculated using the normalized intake air amount Kgcyl which is the ratio between the calculated intake air amount Gcyl and the maximum estimated intake air amount Gcyl_max, so that when Gin_vt≦Gin1 or Gin2≦Gin_vt holds, that is, even in a region where reliability of one of the first and second estimated intake air amounts Gcyl_vt and Gcyl_afm exceeds that of the other, it is possible to calculate the ignition timing Iglog with accuracy based on a value higher in reliability. This makes it possible to improve the accuracy of the ignition timing control, which can result in the enhanced fuel economy and combustion stability.

Furthermore, as described hereinbefore, within the range of Gin1<Gin_vt<Gin2, when the estimated flow rate Gin_vt varies between Gin1 and Gin2, the calculated intake air amount Gcyl is progressively changed from a value of one of Gcyl_vt and Gcyl_afm to a value of the other thereof. Therefore, even in cases where if one of the first and second estimated intake air amounts Gcyl_vt and Gcyl_afm were directly switched to the other, a torque step would be caused by a change in the ignition timing Iglog due to a large difference between the first and second estimated intake air amounts Gcyl_vt and Gcyl_afm, it is possible to avoid occurrence of such a torque step.

Further, when it is determined that the air flow sensor 22 is faulty, as described above, Gcyl=Gcyl_vt holds, and the normalized intake air amount Kgcyl is calculated according to the first estimated intake air amount Gcyl_vt in all the load regions, and the ignition timing Iglog is calculated using the normalized intake air amount Kgcyl, so that even when the reliability of the second estimated intake air amount Gcyl_afm low due to the failure of the air flow sensor 22, the ignition timing Iglog can be properly calculated according to the first estimated intake air amount Gcyl_vt, thereby making it possible to ensure excellent accuracy of the fuel injection control.

Furthermore, as described above, when it is determined that at least one of the three variable mechanisms is faulty, or even when the control inputs U_Liftin, U_Cain, and U_Cr are not inputted to the respective three variable mechanisms e.g. due to a disconnection, the valve lift Liftin, the cam phase Cain, and the compression ratio Cr are held by the lock mechanism at respective values which make the intake air amount equal to the predetermined failure time value Gcyl_fs, and the failure time value Ig_fs for the ignition timing is controlled with the response-specifying control algorithm [equations (13) to (15)] such that the engine speed NE becomes equal to the failure-time target engine speed NE_fs. This makes it possible to continue driving of the vehicle while avoiding acceleration of the engine 3 caused by the increase in the engine speed NE, and deceleration of the engine 3 caused by a decrease in the engine speed NE. As a result, it is possible to ensure minimum required running performance of the vehicle.

Further, since the throttle valve mechanism of the engine 3 is omitted, and the intake passage 12a is formed to have a large diameter, it is possible not only to reduce the flow resistance within the intake passage 12a to enhance the charging efficiency but also to reduce the manufacturing costs of the control system 1.

It should be noted that although the present embodiment is an example of application of the control system 1 according to the present invention to the internal combustion engine 3 for automotive vehicles, the control system is not necessarily limited to this, but it can be applied to internal combustion engines for various uses, such as those installed on boats, electric generators, and the like.

Further, although the present embodiment is an example in which the variable valve lift mechanism 50, the variable cam phase mechanism 70, and the variable compression ratio mechanism 80 are employed as variable intake mechanisms, the variable intake mechanisms are not necessarily limited to these, but they may be any suitable variable intake mechanisms which are capable of changing the intake air amount of intake air drawn into the combustion chamber of the engine 3. For example, a throttle valve mechanism as used in the prior art may be used as the variable intake mechanism.

Furthermore, although the present embodiment is an example in which the normalized intake air amount Kgcyl as a ratio is set such that Kgcyl=Gcyl/Gcyl_max holds, the normalized intake air amount Kgcyl may be set such that Kgcyl=Gcyl_max/Gcyl holds. When set as above, the normalized intake air amount Kgcyl assumes a value in the range of 1 to infinite, and in a range where the calculated intake air amount Gcyl becomes close to the maximum estimated intake air amount Gcyl_max, i.e. in a high-load region of the engine 3 where knocking is liable to occur, the normalized intake air amount Kgcyl becomes equal to 1 or a value in the vicinity thereof, which prevents the normalized intake air amount Kgcyl from being varied between a plurality of set values of the engine speed NE. As a result, similarly to the embodiment, data of the basic ignition timing may be set in the ignition timing maps in association with the plurality of values of the engine speed NE, such that the number thereof is equal between the plurality of values of the engine speed NE with respect to the normalized intake air amount Kgcyl. This makes it possible to reduce the total number of data in the ignition timing maps, compared with the case in which data in the ignition timing maps are set in association with the engine speed NE and the intake air amount, and accordingly reduce the storage capacity of a storage medium, such as the ROM, to thereby reduce the manufacturing costs of the control system.

On the other hand, although the present embodiment is an example in which the first estimated intake air amount Gcyl_vt and the second estimated intake air amount Gcyl_afm are calculated according to the engine speed NE, the cam phase Cain, and the compression ratio Cr as load parameters, the load parameters for use in the calculation of the first estimated intake air amount Gcyl_vt and the estimated flow rate Gin_vt are not necessarily limited to these, but they may be any suitable load parameters which are indicative of load on the engine 3. For example, the target cam phase Cain Cain_cmd and the target compression ratio Cr_cmd may be used, and the valve lift Liftin and/or the target valve lift Liftin_cmd may be used.

Further, although the present embodiment is an example in which the maximum estimated intake air amount Gcyl_max is calculated according to the engine speed NE, the cam phase Cain, and the compression ratio Cr, the maximum estimated intake air amount Gcyl_max may be calculated according to other parameters indicative of the load on the engine. For example, the maximum estimated intake air amount Gcyl_max may be calculated according to the engine speed NE, the target cam phase Cain Cain_cmd, and/or the target compression ratio Cr_cmd, or alternatively according to the engine speed NE, and one of the valve lift Liftin and the target valve lift Liftin_cmd.

Furthermore, although the present embodiment is an example in which the control system 1 according to the present invention is applied to the internal combustion engine 3 in which the intake passage is formed to have a large diameter whereby when the air flow rate Gin is small, i.e. when the load on the engine 3 is low, the reliability of the first estimated intake air amount Gcyl_vt exceeds that of the second estimated intake air amount Gcyl_afm, whereas when the load on the engine 3 is high, the reliability of the second estimated intake air amount Gcyl_afm exceeds that of the first estimated intake air amount Gcyl_vt, the control system 1 according to the present invention is not necessarily limited to this, but it can also be applied to an engine having load regions where the degree of the reliability is inverted between the first estimated intake air amount Gcyl_vt and that of the second estimated intake air amount Gcyl_afm. For example, the control system 1 can be applied to an internal combustion engine in which in a low-load region thereof, the reliability of the second estimated intake air amount Gcyl_afm exceeds that of the first estimated intake air amount Gcyl_vt, whereas in high-load region thereof, the first estimated intake air amount Gcyl_vt exceeds that of the second estimated intake air amount Gcyl_afm, due to occurrence of intake pulsation or excessively high flow velocity of intake air. In this case, in the equation (4), the multiplier term with which Gcyl_afm is to be multiplied and the multiplier term with which Gcyl_vt is to be multiplied may be set to (1−Kg) and Kg, respectively.

Further, although the present embodiment is an example in which the basic fuel injection amount Tcyl_bs is calculated as the product Kgt·Gcyl of the conversion coefficient Kgt and the calculated intake air amount Gcyl, the basic fuel injection amount Tcyl_bs can be configured to be calculated by searching a table according to the estimated intake air amount Gcyl. In this case, it is only required to use a table set for each fuel injection valve 10 in advance.

INDUSTRIAL APPLICABILITY

With the configuration of this control system, a first estimated intake air amount is calculated as an estimated value of the amount of intake air according to an operating condition parameter indicative of an operating condition of a variable intake mechanism; a second estimated intake air amount is calculated as an estimated value of the amount of the intake air according to the flow rate of air flowing through an intake passage of the engine; and the amount of fuel to be supplied to a combustion chamber is determined according to the first estimated intake air amount when a load parameter indicative of load on the engine is within a first predetermined range. Therefore, by setting the first predetermined range to a load region where the reliability of the first estimated intake air amount exceeds the reliability of the second estimated intake air amount due to lowering of the reliability of the flow rate of air detected by air flow rate-detecting means, it is possible, even in such a load region, to properly determine the amount of fuel according to the first estimated intake air amount.

Further, when the load parameter is in a second predetermined range different from the first predetermined range, the amount of fuel to be supplied to the combustion chamber is determined according to a detected flow rate of air, and hence by setting the second predetermined range to a load region where the reliability of the second estimated intake air amount exceeds that of the first estimated intake air amount, it is possible, even in such a load region, to properly determine the fuel amount according to the second estimated intake air amount. As described above, since it is possible to properly determine the fuel amount not only in a load region where the reliability of the first estimated intake air amount exceeds that of the second estimated intake air amount but also in a load region opposite thereto, it is possible to enhance the accuracy of fuel control, that is, the accuracy of air-fuel ratio control. As a result, it is possible to improve fuel economy and reduce exhaust emissions.

The present invention has been made to provide a solution to the above-described problems, and an object thereof is to provide a control system for an internal combustion engine, which is capable of enhancing the accuracy of fuel control and ignition timing control even when there is a possibility that the reliability of a calculated intake air amount lowers, and enables reduction of manufacturing costs.

The invention claimed is:

1. A control system for an internal combustion engine in which a variable intake mechanism changes an amount of intake air drawn into cylinders thereof as desired, the control system controlling an amount of fuel to be supplied to a combustion chamber, comprising:
   operating condition parameter-detecting means for detecting an operating condition parameter indicative of an operating condition of the variable intake mechanism;
   first estimated intake air amount-calculating means for calculating a first estimated intake air amount as an estimated value of the amount of intake air according to the operating condition parameter;
   air flow rate-detecting means for detecting a flow rate of air flowing through an intake passage of the engine;
   second estimated intake air amount-calculating means for calculating a second estimated intake air amount as an estimated value of the amount of intake air according to the flow rate of air;
   load parameter-detecting means for detecting a load parameter indicative of load on the engine; and
   fuel amount-determining means for determining the amount of fuel according to the first estimated intake air amount when the load parameter is within a first predetermined range, and determining the amount of fuel according to the second estimated intake air amount when the load parameter is within a second predetermined range different from the first predetermined range, wherein the first predetermined range and the second predetermined range are set such that they do not overlap each other, and
   wherein said fuel amount-determining means determines the amount of fuel according to the first estimated intake air amount and the second estimated intake air amount when the load parameter is between the first predetermined range and the second predetermine range.

2. A control system as claimed in claim 1, further comprising failure-determining means for determining whether or not said air flow rate-detecting means is faulty, and
   wherein said fuel amount-determining means calculates the amount of fuel according to the first estimated intake air amount irrespective of a value of the load parameter, when said failure-determining means determines that said air flow rate-detecting means is faulty.

3. A control system as claimed in claim 1, further comprising:
   failure-determining means for determining whether or not the variable intake mechanism is faulty; and
   drive means for driving the variable intake mechanism such that the amount of intake air becomes equal to a predetermined value, when said failure-determining means determines that the variable intake mechanism is faulty, and
   wherein said fuel amount-determining means determines the amount of fuel according to the predetermined value, when said failure-determining means determines that the variable intake mechanism is faulty.

4. A control system as claimed in any one of claims 2 or 3, wherein the variable intake mechanism comprises at least one of a variable cam phase mechanism for changing a phase of an intake camshaft of the engine with respect to a crankshaft of the engine, a variable valve lift mechanism for changing a lift of each intake valve of the engine, and a variable compression ratio mechanism for changing a compression ratio of the engine.

5. A control system for an internal combustion engine in which a variable intake mechanism changes an amount of intake air drawn into cylinders thereof as desired, the control system controlling an amount of fuel to be supplied to a combustion chamber, comprising:

operating condition parameter-detecting means for detecting an operating condition parameter indicative of an operating condition of the variable intake mechanism;

first estimated intake air amount-calculating means for calculating a first estimated intake air amount as an estimated value of the amount of intake air according to the operating condition parameter;

air flow rate-detecting means for detecting a flow rate of air flowing through an intake passage of the engine;

second estimated intake air amount-calculating means for calculating a second estimated intake air amount as an estimated value of the amount of intake air according to the flow rate of air;

load parameter-detecting means for detecting a load parameter indicative of load on the engine; and fuel amount-determining means for determining the amount of fuel according to the first estimated intake air amount when the load parameter is within a first predetermined range, and determining the amount of fuel according to the second estimated intake air amount when the load parameter is within a second predetermined range different from the first predetermined range, wherein the variable intake mechanism comprises at least one of a variable cam phase mechanism for changing a phase of an intake camshaft of the engine with respect to a crankshaft of the engine, a variable valve lift mechanism for changing a lift of each intake valve of the engine, and a variable compression ratio mechanism for changing a compression ratio of the engine.

6. A control system as claimed in claim 5, further comprising failure-determining means for determining whether or not said air flow rate-detecting means is faulty, and wherein said fuel amount-determining means calculates the amount of fuel according to the first estimated intake air amount irrespective of a value of the load parameter, when said failure-determining means determines that said air flow rate-detecting means is faulty.

7. A control system as claimed in claim 5, further comprising:

failure-determining means for determining whether or not the variable intake mechanism is faulty; and drive means for driving the variable intake mechanism such that the amount of intake air becomes equal to a predetermined value, when said failure-determining means determines that the variable intake mechanism is faulty, and wherein said fuel amount-determining means determines the amount of fuel according to the predetermined value, when said failure-determining means determines that the variable intake mechanism is faulty.

* * * * *